(12) United States Patent
Holland et al.

(10) Patent No.: US 8,674,608 B2
(45) Date of Patent: Mar. 18, 2014

(54) CONFIGURABLE ENVIRONMENTAL CONDITION SENSING LUMINAIRE, SYSTEM AND ASSOCIATED METHODS

(75) Inventors: Eric Holland, Indian Harbour Beach, FL (US); Mark P. Boomgaarden, Satellite Beach, FL (US); Eric Thosteson, Satellite Beach, FL (US)

(73) Assignee: Lighting Science Group Corporation, Satellite Beach, FL (US)

( * ) Notice: Subject to any disclaimer, the term of this patent is extended or adjusted under 35 U.S.C. 154(b) by 60 days.

(21) Appl. No.: 13/403,531

(22) Filed: Feb. 23, 2012

(65) Prior Publication Data

US 2012/0286673 A1 Nov. 15, 2012

Related U.S. Application Data

(60) Provisional application No. 61/486,316, filed on May 15, 2011, provisional application No. 61/486,314, filed on May 15, 2011, provisional application No. 61/486,322, filed on May 15, 2011.

(51) Int. Cl.
*H05B 37/02* (2006.01)

(52) U.S. Cl.
USPC .......................... 315/155; 315/154; 315/149

(58) Field of Classification Search
None
See application file for complete search history.

(56) References Cited

U.S. PATENT DOCUMENTS

| | | |
|---|---|---|
| 5,319,301 A | 6/1994 | Callahan et al. |
| 5,523,878 A | 6/1996 | Wallace et al. |
| 5,563,422 A | 10/1996 | Nakamura et al. |
| 5,704,701 A | 1/1998 | Kavanagh et al. |
| 5,936,599 A | 8/1999 | Reymond |
| 5,997,150 A | 12/1999 | Anderson |
| 6,140,646 A | 10/2000 | Busta et al. |
| 6,211,626 B1 | 4/2001 | Lys et al. |
| 6,341,876 B1 | 1/2002 | Moss et al. |
| 6,356,700 B1 | 3/2002 | Strobl |
| 6,561,656 B1 | 5/2003 | Kojima et al. |
| 6,594,090 B2 | 7/2003 | Kruschwitz et al. |

(Continued)

FOREIGN PATENT DOCUMENTS

| | | |
|---|---|---|
| WO | WO 02/16824 | 2/2002 |
| WO | WO 2006/095315 | 9/2006 |

(Continued)

OTHER PUBLICATIONS

Tannith Cattermole, "Smart Energy Glass controls light on demand", Gizmag.com, Apr. 18, 2010, accessed Nov. 1, 2011.

(Continued)

*Primary Examiner* — Crystal L Hammond
(74) *Attorney, Agent, or Firm* — Mark R. Malek; Daniel C. Pierron; Zies Widerman & Malek

(57) ABSTRACT

A luminaire with a light source, controller, and sensors to emit light into an environment is described. The controller may include a processor and memory to analyze data relating to conditions in the environment and to control the light source emitting light. The sensors may be in communication with the controller to detect conditions in the environment and generate data relating to same. The data may be receivable by the controller. Rules affect operation of the luminaire, which may be manipulated using an interface. The luminaire may communicate with devices connected through a network. Light and an auxiliary signal may be emitted substantially simultaneously to provide spatial awareness.

84 Claims, 21 Drawing Sheets

(56) References Cited

U.S. PATENT DOCUMENTS

| | | |
|---|---|---|
| 6,733,135 B2 | 5/2004 | Dho |
| 6,767,111 B1 | 7/2004 | Lai |
| 6,817,735 B2 | 11/2004 | Shimizu et al. |
| 6,853,150 B2 | 2/2005 | Clauberg et al. |
| 6,870,523 B1 | 3/2005 | Ben-David et al. |
| 6,871,982 B2 | 3/2005 | Holman et al. |
| 6,876,007 B2 | 4/2005 | Yamazaki et al. |
| 6,967,761 B2 | 11/2005 | Starkweather et al. |
| 6,974,713 B2 | 12/2005 | Patel et al. |
| 7,042,623 B1 | 5/2006 | Huibers et al. |
| 7,066,628 B2 | 6/2006 | Allen |
| 7,070,281 B2 | 7/2006 | Kato |
| 7,072,096 B2 | 7/2006 | Holman et al. |
| 7,075,707 B1 | 7/2006 | Rapaport et al. |
| 7,083,304 B2 | 8/2006 | Rhoads et al. |
| 7,138,770 B2 | 11/2006 | Uang et al. |
| 7,178,941 B2 | 2/2007 | Roberge et al. |
| 7,184,201 B2 | 2/2007 | Duncan |
| 7,246,923 B2 | 7/2007 | Conner |
| 7,255,469 B2 | 8/2007 | Wheatley et al. |
| 7,261,453 B2 | 8/2007 | Morejon et al. |
| 7,289,090 B2 | 10/2007 | Morgan |
| 7,300,177 B2 | 11/2007 | Conner |
| 7,303,291 B2 | 12/2007 | Ikeda et al. |
| 7,325,956 B2 | 2/2008 | Morejon et al. |
| 7,342,658 B2 | 3/2008 | Kowarz et al. |
| 7,344,279 B2 | 3/2008 | Mueller et al. |
| 7,349,095 B2 | 3/2008 | Kurosaki |
| 7,400,439 B2 | 7/2008 | Holman |
| 7,427,146 B2 | 9/2008 | Conner |
| 7,429,983 B2 | 9/2008 | Islam |
| 7,434,946 B2 | 10/2008 | Huibers |
| 7,438,443 B2 | 10/2008 | Tatsuno et al. |
| 7,476,016 B2 | 1/2009 | Kurihara |
| 7,489,086 B2 | 2/2009 | Miskin et al. |
| 7,520,642 B2 | 4/2009 | Holman et al. |
| 7,530,708 B2 | 5/2009 | Park |
| 7,537,347 B2 | 5/2009 | Dewald |
| 7,540,616 B2 | 6/2009 | Conner |
| 7,567,040 B2 | 7/2009 | Pong et al. |
| 7,598,682 B2 | 10/2009 | Grajcar |
| 7,598,686 B2 | 10/2009 | Lys et al. |
| 7,604,378 B2 | 10/2009 | Wolf et al. |
| 7,605,971 B2 | 10/2009 | Ishii et al. |
| 7,607,798 B2 | 10/2009 | Panotopoulos |
| 7,626,755 B2 | 12/2009 | Furuya et al. |
| 7,677,736 B2 | 3/2010 | Kasazumi et al. |
| 7,684,007 B2 | 3/2010 | Hull et al. |
| 7,703,943 B2 | 4/2010 | Li et al. |
| 7,705,810 B2 | 4/2010 | Choi et al. |
| 7,708,452 B2 | 5/2010 | Maxik et al. |
| 7,709,811 B2 | 5/2010 | Conner |
| 7,719,766 B2 | 5/2010 | Grasser et al. |
| 7,728,846 B2 | 6/2010 | Higgins et al. |
| 7,732,825 B2 | 6/2010 | Kim et al. |
| 7,766,490 B2 | 8/2010 | Harbers et al. |
| 7,819,556 B2 | 10/2010 | Heffington et al. |
| 7,828,453 B2 | 11/2010 | Tran et al. |
| 7,828,465 B2 | 11/2010 | Roberge et al. |
| 7,832,878 B2 | 11/2010 | Brukilacchio et al. |
| 7,834,867 B2 | 11/2010 | Sprague et al. |
| 7,835,056 B2 | 11/2010 | Doucet et al. |
| 7,841,714 B2 | 11/2010 | Gruber |
| 7,845,823 B2 | 12/2010 | Mueller et al. |
| 7,852,017 B1 | 12/2010 | Melanson |
| 7,871,839 B2 | 1/2011 | Lee et al. |
| 7,880,400 B2 | 2/2011 | Zhou et al. |
| 7,889,430 B2 | 2/2011 | El-Ghoroury et al. |
| 7,906,789 B2 | 3/2011 | Jung et al. |
| 7,972,030 B2 | 7/2011 | Li |
| 7,976,205 B2 | 7/2011 | Grotsch et al. |
| 8,016,443 B2 | 9/2011 | Falicoff et al. |
| 8,040,070 B2 | 10/2011 | Myers et al. |
| 8,047,660 B2 | 11/2011 | Penn et al. |
| 8,049,763 B2 | 11/2011 | Kwak et al. |
| 8,061,857 B2 | 11/2011 | Liu et al. |
| 8,070,302 B2 | 12/2011 | Hatanaka et al. |
| 8,076,680 B2 | 12/2011 | Lee et al. |
| 8,083,364 B2 | 12/2011 | Allen |
| 8,096,668 B2 | 1/2012 | Abu-Ageel |
| 8,214,084 B2 | 7/2012 | Simon et al. |
| 8,232,745 B2 | 7/2012 | Chemel et al. |
| 8,253,338 B2 * | 8/2012 | Ashoff et al. ............ 315/133 |
| 2003/0039036 A1 | 2/2003 | Kruschwitz et al. |
| 2004/0052076 A1 | 3/2004 | Mueller et al. |
| 2004/0218390 A1 | 11/2004 | Holman et al. |
| 2005/0134188 A1 * | 6/2005 | Lindqvist ............ 315/149 |
| 2005/0174768 A1 | 8/2005 | Conner |
| 2005/0190430 A1 | 9/2005 | Patel et al. |
| 2006/0002101 A1 | 1/2006 | Wheatley et al. |
| 2006/0002108 A1 | 1/2006 | Ouderkirk et al. |
| 2006/0002110 A1 | 1/2006 | Dowling et al. |
| 2006/0138971 A1 | 6/2006 | Uang et al. |
| 2006/0164005 A1 | 7/2006 | Sun |
| 2006/0164607 A1 | 7/2006 | Morejon et al. |
| 2006/0232992 A1 | 10/2006 | Bertram et al. |
| 2006/0285078 A1 | 12/2006 | Kasazumi et al. |
| 2006/0285193 A1 | 12/2006 | Kimura et al. |
| 2006/0291269 A1 | 12/2006 | Doucet et al. |
| 2007/0013871 A1 | 1/2007 | Marshall et al. |
| 2007/0146639 A1 | 6/2007 | Conner |
| 2007/0159492 A1 | 7/2007 | Lo et al. |
| 2007/0188847 A1 | 8/2007 | McDonald et al. |
| 2007/0211449 A1 | 9/2007 | Holman et al. |
| 2007/0241340 A1 | 10/2007 | Pan |
| 2007/0263298 A1 | 11/2007 | El-Ghoroury et al. |
| 2007/0273794 A1 | 11/2007 | Sprague et al. |
| 2008/0143970 A1 | 6/2008 | Harbers et al. |
| 2008/0143973 A1 | 6/2008 | Wu |
| 2008/0198572 A1 | 8/2008 | Medendorp |
| 2008/0211421 A1 | 9/2008 | Lee et al. |
| 2008/0218992 A1 | 9/2008 | Li |
| 2008/0232084 A1 | 9/2008 | Kon |
| 2008/0258643 A1 | 10/2008 | Cheng et al. |
| 2008/0285271 A1 | 11/2008 | Roberge et al. |
| 2009/0009102 A1 | 1/2009 | Kahlman et al. |
| 2009/0046307 A1 | 2/2009 | Kwak et al. |
| 2009/0059099 A1 | 3/2009 | Linkov et al. |
| 2009/0059585 A1 | 3/2009 | Chen et al. |
| 2009/0079355 A1 | 3/2009 | Zhou et al. |
| 2009/0128781 A1 | 5/2009 | Li |
| 2009/0129079 A1 | 5/2009 | Grotsch et al. |
| 2009/0160370 A1 | 6/2009 | Tai et al. |
| 2009/0184662 A1 | 7/2009 | Given et al. |
| 2009/0184666 A1 | 7/2009 | Myers et al. |
| 2009/0261748 A1 | 10/2009 | McKinney et al. |
| 2009/0262516 A1 | 10/2009 | Li |
| 2009/0267085 A1 | 10/2009 | Lee et al. |
| 2009/0273918 A1 | 11/2009 | Falicoff et al. |
| 2010/0006762 A1 | 1/2010 | Yoshida et al. |
| 2010/0025700 A1 | 2/2010 | Jung et al. |
| 2010/0046234 A1 | 2/2010 | Abu-Ageel |
| 2010/0051976 A1 | 3/2010 | Rooymans |
| 2010/0060181 A1 | 3/2010 | Choi et al. |
| 2010/0061068 A1 | 3/2010 | Geissler et al. |
| 2010/0061078 A1 | 3/2010 | Kim |
| 2010/0072494 A1 | 3/2010 | Lee et al. |
| 2010/0103389 A1 | 4/2010 | McVea et al. |
| 2010/0109031 A1 | 5/2010 | Lee et al. |
| 2010/0110516 A1 | 5/2010 | Penn et al. |
| 2010/0117101 A1 | 5/2010 | Kim et al. |
| 2010/0128233 A1 | 5/2010 | Liu et al. |
| 2010/0141153 A1 * | 6/2010 | Recker et al. ............ 315/149 |
| 2010/0165599 A1 | 7/2010 | Allen |
| 2010/0202129 A1 | 8/2010 | Abu-Ageel |
| 2010/0213859 A1 | 8/2010 | Shteynberg et al. |
| 2010/0231136 A1 | 9/2010 | Reisenauer et al. |
| 2010/0231863 A1 | 9/2010 | Hikmet et al. |
| 2010/0232134 A1 | 9/2010 | Tran |
| 2010/0244700 A1 | 9/2010 | Chong et al. |
| 2010/0244724 A1 | 9/2010 | Jacobs et al. |
| 2010/0270942 A1 | 10/2010 | Hui et al. |
| 2010/0277084 A1 | 11/2010 | Lee et al. |
| 2010/0295483 A1 * | 11/2010 | Ashoff et al. ............ 315/312 |

(56) References Cited

U.S. PATENT DOCUMENTS

| | | |
|---|---|---|
| 2010/0302464 A1 | 12/2010 | Raring et al. |
| 2010/0308738 A1 | 12/2010 | Shteynberg et al. |
| 2010/0308739 A1 | 12/2010 | Shteynberg et al. |
| 2010/0315320 A1 | 12/2010 | Yoshida |
| 2010/0320927 A1 | 12/2010 | Gray et al. |
| 2010/0320928 A1 | 12/2010 | Kaihotsu et al. |
| 2010/0321641 A1 | 12/2010 | Van Der Lubbe |
| 2010/0321933 A1 | 12/2010 | Hatanaka et al. |
| 2011/0012137 A1 | 1/2011 | Lin et al. |
| 2011/0193484 A1* | 8/2011 | Harbers et al. ............ 315/129 |
| 2012/0223646 A1* | 9/2012 | Recker et al. ............ 315/152 |
| 2013/0214687 A1* | 8/2013 | Weaver ............ 315/151 |

FOREIGN PATENT DOCUMENTS

| | | |
|---|---|---|
| WO | WO 2007/125477 | 11/2007 |
| WO | 2010/027459 A2 | 3/2010 |
| WO | 2010/098811 A2 | 9/2010 |
| WO | 2011/008251 A2 | 1/2011 |
| WO | 2011/016860 A1 | 2/2011 |

OTHER PUBLICATIONS

Gonzales, Rafael C., et al., "Digital Image Processing", Second Edition, ISBN-0-201-18075-8, 3 pages, 2002.

Lefaix, Gildas, et al., "Motion-based Obstacle Detection and Tracking for Car Driving Assistance," IAPR Int. Conf. on Pattern Recognition, ICPR'2002, vol. 4, pp. 74-77, Quebec, Canada, Aug. 2002.

Lyrtech Inc., "Intelligent occupancy sensor High-performance motion detection solution," Canada, 2 pages, Jun. 2009.

Texas Instruments, "Video and Vision Guide," pp. 1-81, 4Q 2009.

International Search Report and Written Opinion for PCT/US2013/027226 dated Nov. 18, 2013.

* cited by examiner

CONFIGURABLE ENVIRONMENTAL CONDITION SENSING LUMINAIRE, SYSTEM AND ASSOCIATED METHODS

RELATED APPLICATIONS

This application is related to and claims the benefit of U.S. Provisional Patent Application Ser. No. 61/486,316 titled MOTION DETECTING SECURITY LIGHT AND ASSOCIATED METHODS filed on May 15, 2011, the entire contents of which are incorporated herein by reference. This application is also related to and claims the benefit of U.S. Provisional Patent Application Ser. No. 61/486,314 titled WIRELESS LIGHTING DEVICE AND ASSOCIATED METHODS filed on May 15, 2011, the entire contents of which are incorporated herein by reference. This application is further related to and claims the benefit of U.S. Provisional Patent Application Ser. No. 61/486,322 titled VARIABLE LOAD POWER SUPPLY filed on May 15, 2011, the entire contents of which are incorporated herein by reference.

FIELD OF THE INVENTION

The present invention relates to the field of lighting devices. More specifically, the present invention relates to luminaires that include a light source to illuminate an environment in which a condition may be detected.

BACKGROUND OF THE INVENTION

Luminaries have traditionally been used to illuminate an area to deter the presence of trespassers, making an environment more secure. However, to illuminate an environment, the luminaire must be emitting light and consuming energy. Operating the luminaire during the day, when the environment may already be illuminated by the sunlight, may be inefficient and wasteful of energy.

As a result, proposed solutions in the prior art have included photoelectric sensors to detect the presence of light. By using a photoelectric sensor, a luminaire could automatically turn off during a time in which the environment may be illuminated by daylight.

However, a luminaire that includes a photoelectric sensor may lack operation control during the period between sunset and sunrise. Although the amount of energy consumed by the luminaire has been reduced, the luminaire may still be illuminating an environment when there are no objects, such as trespassers, or other conditions that would need illuminated. Additionally, a photoelectric sensor may sense the ambient light levels in an environment due to the light produced by the lighting device to which the sensor is attached. Furthermore, traditional ambient light sensors, such as photoelectric sensors, are typically bulky and aesthetically unappealing.

In an attempt to address the inefficiencies inherent to using a photoelectric sensor to control operation of the luminaire relative to ambient light conditions, devices in the prior art have included passive infrared sensors to detect motion. However, the addition of these motion sensors may add an undesirable amount of bulk to the lighting device to which it is attached. Also, due to the limited configurability of motion sensors in the prior art, numerous false detection of movement as well as low detection rates may occur depending on ambient conditions.

Additionally, luminaires of the prior art typically require sensors to be directly connected to each luminaire. In some configurations, multiple luminaires will be positioned throughout the environment. According to the prior art, each of these luminaires would require independent sensors to detect motion, ambient light, and/or other conditions of the environment, which may operate inconsistently. There exists a need for an intelligent luminaire that may communicate with additional luminaires in the environment to create a network and share sensory data.

Furthermore, the luminaires of the prior art lack an ability to easily modify operation through a simplified and uniform interface. There exists a need for a configurable luminaire, the operation of which may be modifiable by a user through an accessible interface.

As a result, there exists a need for a luminaire that may illuminate an environment in which a condition is detected. There additionally exists a need for a lighting device that provides an interface to configure the operation of the luminaire. There further exists a need for a luminaire that combines illumination, motion detection, and ambient light detection in one device.

SUMMARY OF THE INVENTION

With the foregoing in mind, embodiments of the present invention are related to a luminaire that may illuminate an environment in which a condition is detectable, along with a related system and methods. The luminaire may additionally provide an interface to configure the operation of the luminaire. Furthermore, the luminaire may advantageously combine illumination, motion detection, and ambient light detection in one device. Moreover, the luminaire may communicate with additional luminaires in the environment to create a network and share data, such as sensory data. By providing a luminaire that advantageously combines these features, the present invention may beneficially possess characteristics of higher operational efficiency, increased product life, and reduced complexity, size, and manufacturing expense. Embodiments of the present invention also advantageously provide a configurable luminaire, the operation of which may be modifiable by a user through an accessible interface.

These and other features and advantages according to an embodiment of the present invention are provided by a luminaire that may comprise a light source, a controller, and sensors. Light may be emitted by the light source into an environment. The controller may include a processor and memory to analyze data relating to conditions in the environment and to control the light source. The sensors may be in communication with the controller to detect the conditions in the environment. The sensors may also generate data relating to the conditions. The data may be receivable by the controller.

Rules may be definable to affect operation of the light source. The rules may be stored in the memory, which may be compared with the data. The light source may be operable in a plurality of modes defined by the rules. Operation of the light source may be modifiable by the controller responsive to the data, which may relate to one or more of the conditions.

The light source may be operable having a duty cycle controlled by the controller. The duty cycle may have an active duration and an inactive duration. In the active duration, the light source may emit the light. Conversely, in the inactive duration, the light source may not emit the light.

The sensors may include a motion detector in communication with the controller to detect motion in the environment as the condition. The motion detector may transmit the data to the controller relating to motion that is detected. Additionally, ambient light levels in the environment may be detected by at least one of the sensors in communication with the controller as the condition. The data may be transmitted to the controller relating to the ambient light levels that are detected. The ambient light levels may be detected during the inactive duration of the duty cycle.

According to an embodiment of the present invention, the ambient light levels are detectable by an ambient light detector in communication with the controller. The ambient light detector may detect the ambient light levels in the environment as the condition. The controller may receive the data from the ambient light detector relating to the ambient light levels that are detected.

According to an embodiment of the present invention, a timer may be in communication with the controller to transmit data to the controller. The data may relate to an amount of time elapsed, which may be relative to an event definable by the ales. The timer may optionally be included in the controller.

According to an embodiment of the present invention, a network interface may be in communication with the controller. At least part of the data may be transmittable by the controller using the network interface. Additionally, data may be receivable by the controller using the network interface.

The controller, the light source, and at least one sensor may be included in a node. The node may be part of a network of nodes. Additionally, a plurality of nodes may be included in the network of nodes. Data may be transmittable and receivable between the nodes included in the network of nodes. In additional embodiments of the present invention, the node may be spatially aware relative to at least part of the nodes in the network of nodes.

The light source may be a light emitting semiconductor device. Light emitted by the light source may include a source wavelength range. At least part of the light in the source wavelength range may be received by a phosphorescent, fluorescent, or luminescent conversion material to be converted to a converted wavelength range. The light in the converted wavelength range may be includable in the light.

Alight identifier may be included in the light and an auxiliary signal emitter may also be included in the luminaire. The auxiliary signal emitter may emit an auxiliary signal having a velocity that differs from the light. An auxiliary signal identifier may be included in the auxiliary signal. The light identifier and the auxiliary signal identifier are definable to identify the light that correlates with the auxiliary signal, both of which may be emitted substantially simultaneously.

The light with the light identifier and the auxiliary signal with the auxiliary signal identifier may be detectable by at least one of the sensors. The controller may analyze a delay between detecting the light with the light identifier and the auxiliary signal with the auxiliary signal identifier to determine a spatial awareness. In an embodiment of the present invention, the auxiliary signal is ultrasonic.

According to an embodiment of the present invention, an interface may be used to define the rules. The interface may include inputs, which may be located on a surface of the luminaire. In some embodiments, the inputs may be manipulable to cause a signal to be sent to the controller. The signal may relate to a state of one or more input. Additionally, the states of the inputs may be independently altered upon being engaged by an object. The states to which the input is altered is definable by the rules.

The controller may be carried by a radio logic board, the luminaire may also include an antenna coupled to the radio logic board. The radio logic board may be separated from heat producing elements of the luminaire by a buffer distance.

The present invention is also directed to a system for controlling a luminaire. The system may include a controller including a processor and memory to analyze data and to control a light source to emit light and an interface that is manipulable to cause a signal to be sent to the controller. The signal may relate to a state of the interface. The system according to an embodiment of the present invention may also include sensors in communication with the controller to detect a condition in the environment and generate the data relating to the condition. The data may be transmittable to the controller for analysis.

Rules that are definable to affect operation of the light source may also be included. The rules may be stored in the memory to be comparable with the data, and the rules may be definable using the interface. The light source may be operable in a plurality of modes defined by the rules. At least one of the plurality of modes may be selectable and definable using the interface. For example, the light source may be operable by dimming the light source or moving the light source between an on position and an off position.

A method aspect of an embodiment of the present invention is for controlling a luminaire with an interface. The method may comprise receiving a signal by a controller from the interface. The interface may be manipulable to generate the signal. Additionally, the controller may include a processor and memory.

The method may also include analyzing the signal using the controller by comparing the signal to rules included in the memory. At least part of the rules may be definable using the interface to control operation of a light source to emit light. The method may additionally include receiving data from sensors in communication with the controller relating to a condition detected in the environment. The data may be receivable by the controller from the sensors for analysis. Moreover, the method may include comparing the data received by the sensor with at least part of the rules. The light source may be operated in a mode determined by comparing the data with the rules. An interface used with this method may include a plurality of inputs. In an embodiment, the inputs are locatable on a surface of the luminaire, such that the inputs are manipulable to cause the signal to be sent to the controller. The signal may relate to a state of one or more input.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper, e" and other like terms are used for the convenience of the reader in reference to the drawings. Also, a person skilled in the art should notice this description may contain other terminology to convey position, orientation, and direction without departing from the principles of the present invention.

Referring to FIGS. 1-22, a luminaire 10 according to an embodiment of the present invention is now described in greater detail. Throughout this disclosure, the luminaire 10 may also be referred to as a system, device, lighting device, or the invention. Alternate references of the luminaire 10 in this disclosure are not meant to be limiting in any way.

Figure 1:
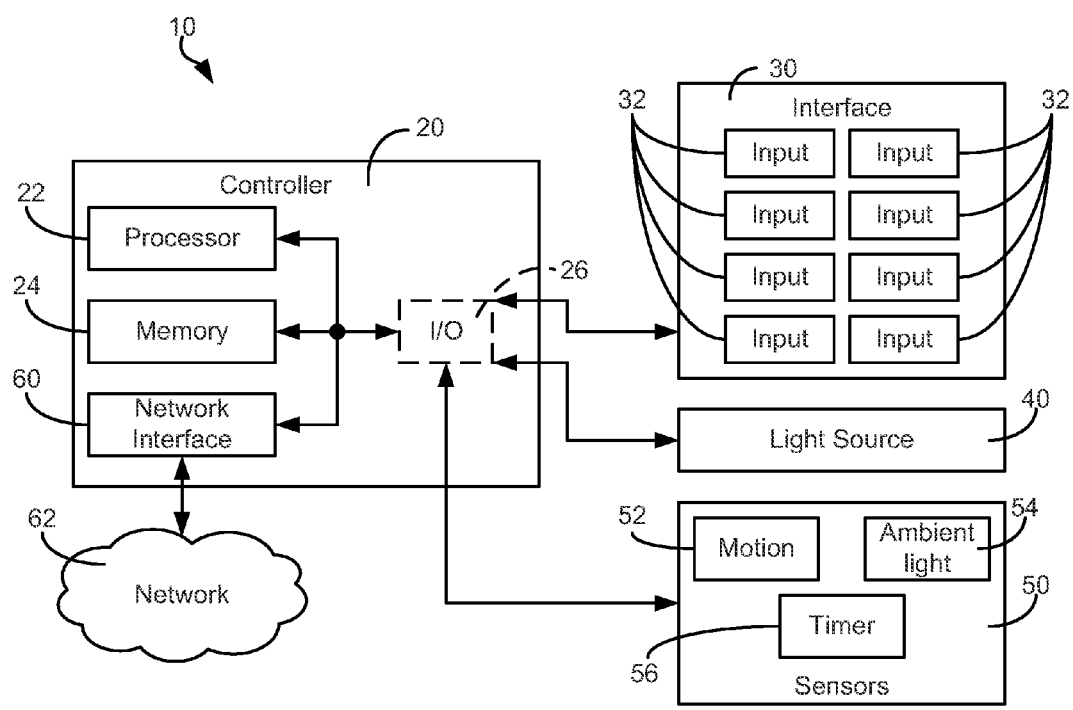
FIG. 1 is a block diagram illustrating the components of a luminaire, according to an embodiment of the present invention.
Figure 2:
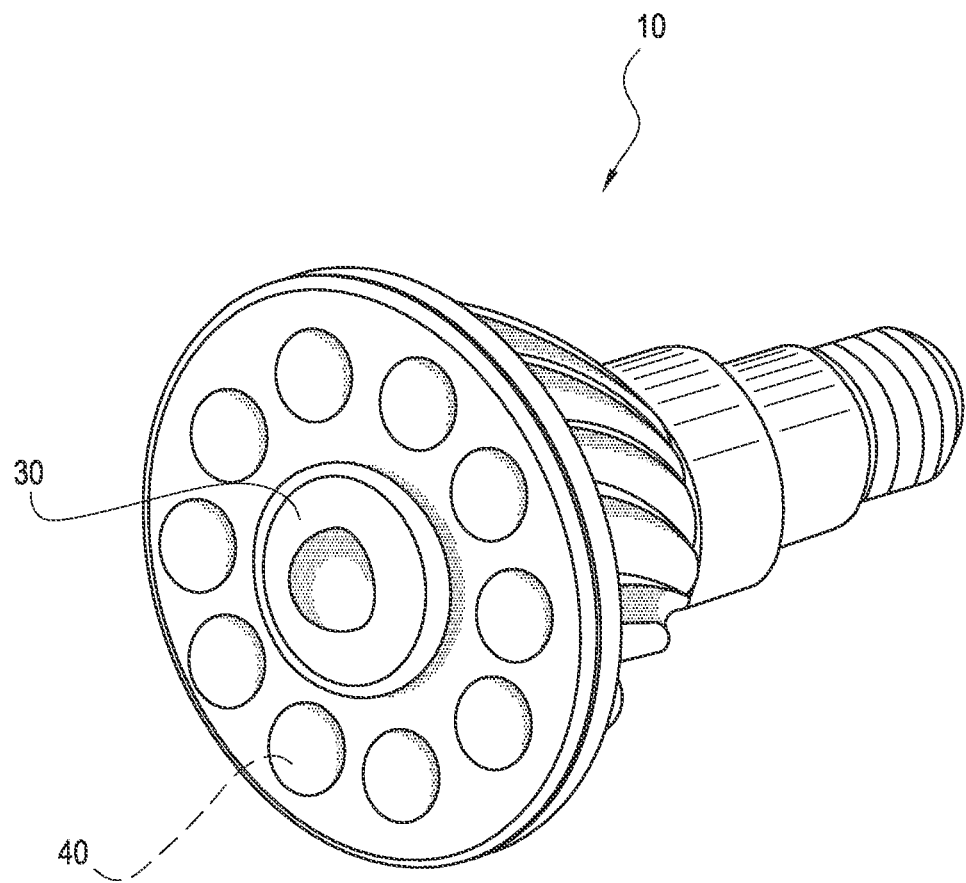
FIG. 2 is a perspective view illustrating a luminaire including an lair interface, according to an embodiment of the present invention.

As perhaps best illustrated in the block diagram of FIG. 1, along with the perspective view of FIG. 2, the luminaire 10 according to an embodiment of the present invention may include a controller 20, an interface 30 with inputs 32, a light source 40, and sensors 50. Those of skill in the art will appreciate that the controller 20 may be a microcontroller, gate array, system-on-a-chip, general purpose processing element, or collections of electronic components capable of processing data. Preferably, but without limitation, the controller 20 may further include a central processor 22 (CPU), memory 24, network interface 60 that may be connected to a network 62, and/or an input/output (I/O) interface 26. Skilled artisans will appreciate that one or more of the aforementioned elements of the controller 20 may be located outside of the controller, or omitted from the controller, as the embodiments of the present invention may vary. The light source 40 may include one or more light emitting semiconductor device, such as a light emitting diode (LED).

Skilled artisans will appreciate that although the light source 40 may be discussed in this disclosure as including light emitting diodes capable of emitting light in a source wavelength range, other light sources 40 may be used. In preferred embodiments, light emitting semiconductor devices may be used to provide illumination. Other embodiments of the present invention may include a light source 40 that is generated by a laser device. However, those of skill in the art will appreciate light sources 40 that are not semiconductor-based are intended to be included within the scope of the present invention. Those skilled in the art will appreciate that the light from the light source 40 could be provided by any number of lighting technologies, each of which are intended to be included within the scope and spirit of the present invention.

A controller 20 may be included in the luminaire 10. As previously stated, the controller 20 may include a processor 22, memory 24, network interface 60, and an I/O interface 26. One or more of these components of the controller 20 may be located outside of the controller 20 and/or communicatively connected to the controller 20. The processor 22 may be configured to receive a data signal from additional components of the luminaire 10, such as a sensor 50 or the interface 30. Those skilled in the art will also appreciate that the controller may be carried by a radio logic board, and that the luminaire may include an antenna coupled to the radio logic board. The antenna may, for example, be used to transmit a signal that caries data. The radio logic board may be separated from heat producing elements of the luminaire by a buffer distance. The buffer distance is a distance suitable to facilitation reduction of attenuation of the signal. Additional details and illustrations of the radio logic board, as well as the buffer distance where the radio logic board is positioned, are set forth in U.S. Provisional Patent Application No. 61/486,314 titled WIRELESS LIGHTING DEVICE AND ASSOCIATED METHODS filed on May 15, 2011, the entire contents of which are incorporated herein by reference.

The processor 22 may compute and perform calculations to the data that has been received from the additional components. As a non-limiting example, the processor 22 may receive sensory data from motion detector 52, such as an infrared motion detecting sensor. The processor 22 may then analyze the data to determine whether the characteristics of the data are indicative of motion in the environment, if the processor 22 determines that the sensory data is indicative of motion, the processor 22 may generate a control signal indicating that motion has been detected. This control signal may be used to control a mode of operation for the luminaire 10, which may include controlling the level of light emitted by the light source 40, optionally further including controlling the duty cycle of one or more light source 40.

The controller 20 may also include memory 24. The memory 24 may include volatile and/or non-volatile memory modules. Volatile memory modules may include random access memory, which may temporarily store data and code being accessed by the processor 22. The non-volatile memory may include flash based memory, which may store a computerized program to be operated on the processor 22. The memory may also store sensory data detected by one or more of the sensors 50.

Additionally, the memory 24 may include the computerized code used by the processor 22 to control the operation of the luminaire 10. The memory 24 may also store feedback information related to the operation of additional components included in the luminaire 10. In an embodiment of the present invention, the memory 24 may include an operating system, which may additionally include applications to be run from within the operating system, as will be appreciated by a person of skill in the art.

The memory 24 may include information to be analyzed by the processor 22. This information may include the states of the various inputs 32, data received from the sensors 50, modes of operation, and rules to govern the analysis of the aforementioned information. The rules may be included in memory 24 to define an operation to be performed on the information, a comparison between various pieces of information, or otherwise define the operation of the various embodiments of the present invention. Preexisting rules may be programmed into the memory 24. Additionally, rules may be defined or modified by a user. The rules may be defined or modified, for example, and without limitation, through an interface 30.

The controller 20 may also include an I/O interface 26. The I/O interface 26 may control the receipt and transmission of data and/or signals between the controller 20 and additional components. Provided as a non-limiting example, the I/O interface 26 may receive a sensory signal from a sensor, which may be indicative of a condition of the environment. After the processor 22 has analyzed the signal, it may use the I/O interface 26 to transmit a control signal to the light source 40 to affect the light emitted.

The sensors 50 may include any number of sensory devices to detect a condition in the environment. The sensors 50 may be directly connected to the controller 20 through a wired and/or wireless connection. In additional embodiments, sensors 50 may communicate with the controller 20 through a network 62. These network 62 connected sensors 50 may be positioned independently of a luminaire 10, or may alternatively be included and operated in another luminaire 10 within the network 62. According to embodiments of the present invention, examples of motion detection, ambient light detection, and timing sensors 50 will be discussed throughout this disclosure. Those of skill in the art will appreciate that these specific example are discussed in the interest of clarity, and are not intended to limit the present invention to those examples.

According to an embodiment of the present invention, a motion detector 52 may be defined as an electronic device that detects motion in an environment and generates an electronic signal relative to that motion. The motion detector 52 may transmit and/or receive one or more signals to detect motion. These signals may include, but should not be limited to, infrared, ultrasonic, microwave, and radio waves. The detection may passive, such as with an infrared sensor 50 detecting body heat moving within an environment. The detection may alternatively be active, such as with an ultrasonic emitter emitting a wave and detecting its reflection from an object in the environment.

Provided as a specific example, without limitation, the motion detector 52 may include a passive infrared (PIR) sensor 50 for the detection of motion. The motion detector 52 may detect differing levels of motion, from which a signal may be analyzed. The sensitivity and operation of the motion detector 52 may be adjustable using the interface 30. Additionally, the motion detector 52 may be enabled or disabled using the interface 30. The motion detector 52 may additionally be configured to transmit a signal when motion may be absent from the field of view in the environment for a period of time, which may also be adjustable by the user.

According to an additional embodiment of the present invention, an ambient light detector 54 may include one or more photosensors and/or photodetectors to sense a level of ambient light in an environment. For the purpose of this disclosure, ambient light may be defined as the light existing in an environment that is not being provided by the luminaire 10. Ambient light sensors 50 may include one of a plurality of sensors 50 that would be appreciated by those of skill in the art to detect a light level in the environment.

Example of ambient light detectors 54, presented for clarity and without limitation, may include silicon light sensors, active pixel sensors, charge-coupled devices, CMOS sensors, LEDs configured in reverse-bias, optical detectors, photoresistors, photodiodes, photovoltaic cells, a combination of one or more of the aforementioned sensors, or any number of additional sensors that would be apparent to a skilled artisan. As will be discussed in greater detail below, the operation of the ambient light sensor 50 may be synchronized with the operation of the light source 40. This synchronization may be controlled by the controller 20.

Provided as a specific example, without limitation, the ambient light detector 54 may include a silicon light sensor. This non-limiting example of an ambient light detector 54 may estimate the ambient light conditions in the environment in which the luminaire 10 is operating. Differing signals may be transmitted to the controller 20 for analysis depending on the ambient light levels detected in the environment. In one embodiment, the luminosity of ambient light may be classified in as few as two levels, such as day and night. In other embodiments, the luminosity of ambient light may be classified in as many as a virtually limitless number of levels. These levels may be definable using the interface 30. The interface may be used to add or remove levels, enable or disable the ambient light detector 54, or otherwise configure the operation of the ambient light detector 54.

A timer 56 may also be included as a sensor 50 to determine a quantity of time that may have elapsed from a starting point. The timer 56 may be configured to detect the amount of time that has elapsed since the occurrence of an event, the event being definable by the rules. The timer 56 may also begin counting down after an event has been detected, the expiration of which being definable to initiate another event. An example of an event may include a change in the state of the light source 40, such as to provide additional or decreased illumination. Operation of the timer 56 will be discussed in greater detail below. The operation in the foregoing examples may be defined by the rules.

In an additional example of an embodiment including an ambient light sensor 50 and a timer 56, the luminaire 10 may be operated in a part night operation. During part night operation, the luminaire 10 may operate normally upon the detection of low luminosity in the environment, such as a dark environment. Normal operation may include illuminating the environment with a medium to high output of light. Upon the detection of low luminosity, which may be defined as a triggering event by the rules, the timer 56 may begin counting.

Skilled artisans will appreciate that the timer 56 may count increment or decrement, as it may be definable in the rules, as would be consistent with the scope and spirit of the present invention. When the timer 56 reaches a limit, the luminaire 10 may further reduce the output of light emitting from the light source 40. This output reduction may include adjusting at least one light source 40 to emit no light.

Continuing with the same example, the controller 20 of the luminaire 10 may additionally be configured to receive data from the motion detector 52. The output of light provided by the light source 40 may be adjusted in further relation to the data received by the controller 20 from the motion detector 52. For instance, the timer 56 may have expired, resulting in the controller controlling the light source to emit virtually no light. An object may cause motion in the environment, which may be detected by the motion detector 52. The controller 20 of the luminaire 10 may analyze the data relating to detected motion and control the light source 40 to increase its output to approximately full output. The luminaire 10 may further be defined to reduce the output time after motion is no longer detected.

Still referring to FIG. 1, the luminaire 10 may include a light source 40. The light source 40 may include LEDs configured to illuminate an environment in which the luminaire 10 is located. A person of skill in the art will appreciate that, although the light source 40 may be discussed as an LED herein, any device capable of producing light to illuminate an area may be included within the scope of the present invention.

An LED may emit light when an electrical current is passed through the diode, typically in the forward bias. The LED may be driven by the passing electrical current to provide an electroluminescence, or emission of light. The color of the emitted light may be determined in part by the materials used in the construction of the light emitting semiconductor.

The light source 40 may emit a light in various spectrums of light. For example, the light source 40 may emit a light in the visible spectrum. This visible light may illuminate an environment, advantageously deterring the presence of trespassers. In another example, the light source 40 may emit a light in the infrared spectrum. This infrared light may illuminate an environment with a light that is not typically visible to the human eye, but may be visible to another device, such as a camera with a video sensor capable of detecting infrared light. The camera may be communicatively connected to the luminaire 10, for example through a network 62, or be provided as a stand-alone device separate from the luminaire 10. The use of infrared light may advantageously allow the luminaire 10 to assist another device to monitor and detect motion in an area when light within the visible spectrum is not being emitted.

A conversion material may be applied to the LEDs to create a desired output color. The inclusion of a conversion material may advantageously allow the luminaire 10 of the present invention to include high efficacy LEDs, increasing the overall efficiency of the luminaire 10. Additionally conversion materials may be included to convert the light emitted by a light source 40, such as a conversion phosphor, delay phosphor, or quantum dot, to modify or increase the light outputted by the light source 40.

An example of the inclusion of a conversion material will now be provided, without the intention to limit the luminaire 10 of the present invention to a single embodiment. In this example, the source wavelength range of the light generated by the light source 40 may be emitted in a blue wavelength range. However, a person of skill in the art, after having the benefit of this disclosure, will appreciate that LEDs capable of emitting light in any wavelength ranges may be used in the light source 40, in accordance with this disclosure of the present invention. A skilled artisan will also appreciate, after having the benefit of this disclosure, additional light generating devices that may be used in the light source 40 that may be capable of creating an illumination.

Continuing with the present example of the light source 40 including a conversion material, the lighting source may generate a source light with a source wavelength range in the blue spectrum. The blue spectrum may include light with a wavelength range between 400 and 500 nanometers. A source light in the blue spectrum may be generated by a light emitting semiconductor that is comprised of materials that may emit a light in the blue spectrum. Examples of such light emitting semiconductor materials may include, but are not intended to be limited to, zinc selenide (ZnSe) or indium gallium nitride (InGaN). These semiconductor materials may be grown or formed on substrates, which may be comprised of materials such as sapphire, silicon carbide (SiC), or silicon (Si). A person of skill in the art will appreciate that, although the preceding semiconductor materials have been disclosed herein, any semiconductor device capable of emitting a light in the blue spectrum is intended to be included within the scope of the present invention.

Continuing with the present example, the conversion material may include a phosphor substance, which may be applied or located adjacent to the blue LEDs. The phosphorous substance may which may absorb wavelength ranges of emitted by the LEDs and emit light defined in additional wavelength ranges when energized. Energizing of the phosphor may occur upon exposure to light, such as the source light emitted from the light source. The wavelength of light emitted by a phosphor may depend on the materials from which the phosphor is comprised.

Referring back to FIG. 1, the luminaire 10 according to an embodiment of the present invention may include a network interface 60. A person of skill in the art will appreciate that the network interface 60 may be included within the controller 20 discussed above. Alternately, a skilled artisan will appreciate that the network interface 60 may be operatively connected to the controller 20, wherein it may operate as an interface device between the controller 20 and a connected network 62, such as for example, a home network, corporate network, or the Internet.

The network interface 60 may provide a channel for the electronic communication of data between the luminaire 10 and a connected device connected through the network 62. Provided without the intent to be limiting, examples of network connected devices may include additional luminaires 10, personal computers, tablets, smartphones, personal data assistants, a data center, remote, key fob, a light switch, or other electronic devices capable of connecting to a network 62.

The network interface 60 may connect to a network 62 using a proprietary or standard connection protocol. With respect to embodiments of the present invention that include a proprietary network connection, the network interface 60 may perform handshake operations and exchange data with network 62 connected devices, as may be defined within the proprietary protocol. Alternately, the network interface 60 may connect to a network 62 using a standardized protocol. Examples of standardized protocols, provided without the intent to be limiting, may include 802.3 Ethernet, 802.11 Wi-Fi, 802.15.1 Bluetooth, 802.15.4 low rate personal area network 62 (PAN) environments, packet switching wide area networks (WAN), cellular relay WANs, or additional standardized data transmission protocols.

In additional embodiments, the data may be transmitted and received throughout a network 62 by emitting and detecting light. The light may be modulated such to include transmittable data. Preferably, the data will be transmitted in the light digitally by modulating between the emission and non-emission of light during a period. Alternatively, the data may be transmittable by modulating the analog frequency or amplitude of the light, or other emitted signal. The light may be detectable by a sensor, such as, for example, the ambient light sensor, during the periods of the duty cycle in which no light is being emitted. A person of skill in the art will appreciate that these periods may be short enough to be unperceivable by the human eye. Additionally, the network 62 may be transmittable using an auxiliary signal, such as an ultrasonic or Wi-Fi signal.

As illustrated in FIG. 1, the luminaire 10 may additionally include an interface 30 to control its operation. The interface 30 may include a plurality of inputs 32, which may be manipulated by a user to define the operation of the luminaire 10. A person of skill in the art will appreciate that as few as one input 32 may be included in the interface 30 and be contemplated by the scope of this disclosure. Similarly, a skilled artisan will appreciate that the maximum number of inputs 32 may be virtually limitless. Preferably, a moderate number of inputs 32, for example eight inputs 32, may be included in the interface 30 to advantageously allow a diverse combination of controls to be selectable by the user without rendering the luminaire 10 overly complex.

With relation to the present invention, an input 32 may be defined as an element of the interface 30 through which the operation of the luminaire 10 may be modified. As will be discussed in greater detail herein, the input 32 may be provided by any number of means such as, for example, a mechanical toggle, a capacitive sensor, or any other system, device or apparatus suitable to cause the transmission of a signal to the controller 20. In one embodiment, the input 32 may be a mechanical toggle, which may be physically engaged and mechanically altered to change the state of the toggle. For example, the mechanical toggle inputs 32 may be a switch that open or dose an electrical circuit upon being manipulated.

In another example, an input 32 may be a capacitive sensor. The state of a capacitive sensor input 32 may be altered upon the detection of an object located in proximity of the capacitive sensor. Skilled artisans will appreciate that a capacitive sensor may detect the proximity of an object using position, displacement, humidity, fluid level, acceleration, or other measurable changes in capacitance. Additional inputs 32 will be appreciated by a person of skill in the art. An example of an object may include the finger of a user, without limitation. The signal resulting from the touch may be received by the controller 20, which may be analyzed to determine a state of operation for the luminaire 10.

A person of skill in the art will appreciate that any number of components capable of altering a signal may be included as an input 32, and should not limit the input 32 to the examples discussed above. Further examples for the operation of the inputs will be provided below.

The inputs 32 may be located on a surface of the luminaire 10. Alternatively, the inputs 32 may be operatively connected to the luminaire 10, such that the inputs 32 may be in communication with the controller 20. In further embodiments, the inputs 32 may be remotely connected to the luminaire 10, which may transmit a signal to be received by a sensor, network interface 60, or other component. Skilled artisans will appreciate that the aforementioned examples of connective structures are provided in the interest of clarity, and should not limit the present invention to the preceding examples.

In an embodiment of the present invention, the network 62 connected device may be an additional luminaire 10. In this example, if motion is sensed by sensors 50 included in one networked luminaire 10, it may transmit an electronic signal to additional network connected luminaires 10 via the network interface 60. Upon receiving the aforementioned electronic signal, the controllers 20 of the additional luminaires 10 may be controlled the operation of the additional luminaires 10 in response to the electronic signal transmitted over the network 62. A person of skill in the art will appreciate additional devices that may be connected via the network interface 60, such as devices with recording capabilities, sirens, indicators, or dialers that may contact police or a security department.

The luminaire 10, according to embodiments of the present invention, may advantageously provide dynamic illumination of an environment with significant customizability in its operation. The luminaire 10 may detect one or more conditions present in an environment to affect how the environment may be illuminated by the luminaire 10. A series of flowcharts will now be presented, along with accompanying descriptions, to illustrate various embodiments of the present invention. A person of skill in the art will appreciate that the follow flowcharts and descriptions are presented in the interest of clearly disclosing the invention, according to a number of its embodiments. Skilled artisans should not view the present invention to be limited to the embodiments discussed below.

Figure 3:
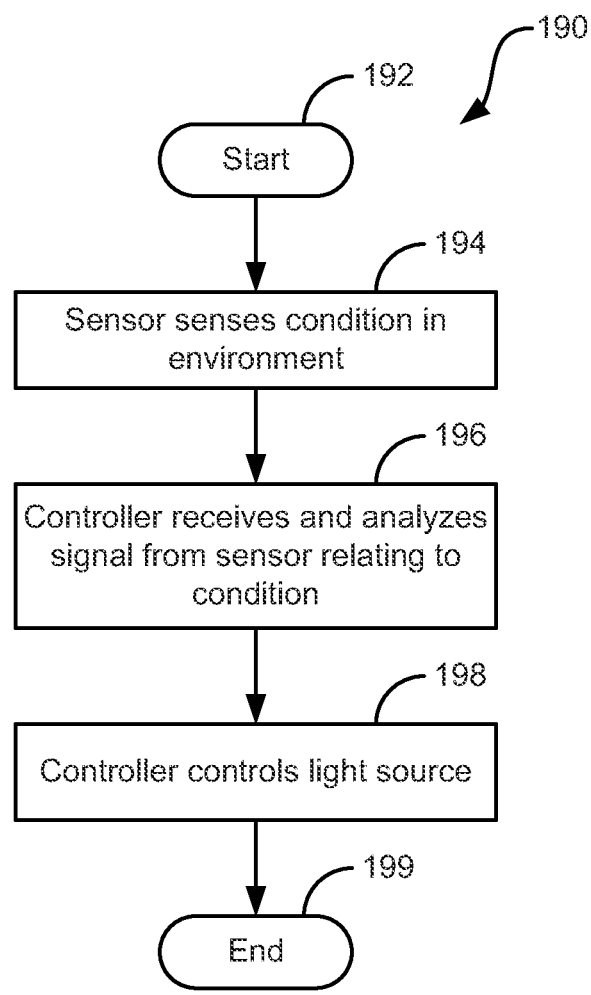
FIG. 3 is a flowchart illustrating operation of a luminaire, according to an embodiment of the present invention.

Referring to flowchart 190 of FIG. 3, operation of the luminaire 10 will be discussed generally, according to an embodiment of the present invention. Starting at Block 192, a sensor 50 may sense a condition in the environment (Block 194). The data generated by the sensor 50 relating to the detected condition may be received and analyzed by the controller 20 (Block 196). The controller 20 may then control the light source 40 with respect to the analysis performed on the data (Block 198). The operation may then terminate at Block 199.

Figure 4:
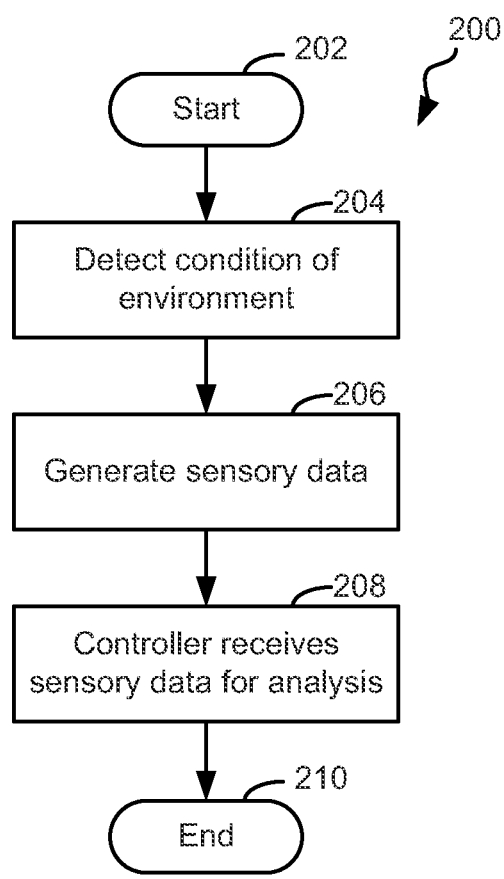
FIG. 4 is a flowchart illustrating detection of a condition in an environment, according to an embodiment of the present invention.

Referring now to flowchart 200 of FIG. 4, operation of the sensor, according to an embodiment of the present invention, will be discussed in greater detail. Starting at Block 202, a sensor 50 may detect a condition of the environment (Block 204). As discussed above, the condition may include motion, ambient light levels, or additional conditions that would be apparent to a person of skill in the art. The sensor 50 may then generate sensory data relating to the detected condition (Block 206). For example, and without limitation, the sensor 50 may be an ambient light detector 54 that senses a high level of ambient light in the environment. The ambient light detector 54 may generate a digital signal, such as a hex value of FE, to convey the condition to controller 20. Skilled artisans will appreciate that analog signals may also be detectable by the controller 20, for example by correlating voltage levels with the level in which the condition is detected in the environment.

The controller 20 may then receive the sensory data from the sensor 50 for analysis (Block 208). The sensory data may have been made available by the sensor 50 to be received by the controller 20. Skilled artisans will appreciate the data may be communicated between the sensor 50 and the controller 20 via transmission by the sensor, polling by the controller 20, or other communications of data that would be readily apparent to after having the benefit of this disclosure. The operation may then terminate at Block 210.

Figure 5:
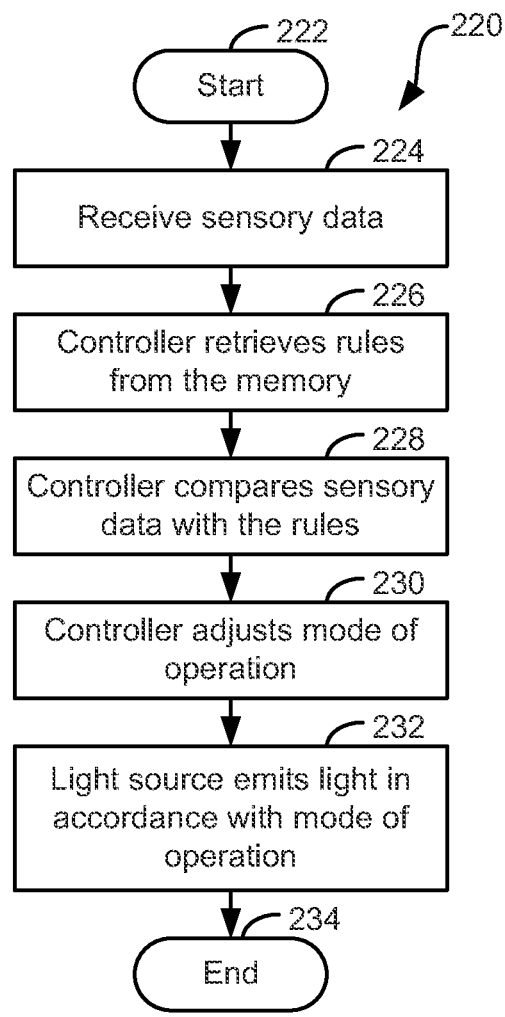
FIG. 5 is a flowchart illustrating an analysis of sensory data and controlling a light source, according to an embodiment of the present invention.

Referring now to flowchart 220 of FIG. 5, operation of the controller 20, according to an embodiment of the present invention, will now be discussed in greater detail. Starting at Block 222, the controller 20 may receive sensory data from at least one of the sensors 50 (Block 224). The controller 20 may then retrieve rules from the memory 24 (Block 226). The memory 24 may be included in the controller 20. Alternatively, the memory 24 including at least some of the rules may be operatively connected to the controller 20 and accessible by the controller 20.

The controller 20 may then analyze the data, for example, by comparing the sensory data with the rules (Block 228). After the data has been analyzed, the controller 20 may adjust the mode of operation of the luminaire 10 (Block 230). Various modes, according to an embodiment of the present invention, may include full output, limited output, emission of light that includes data, emission of light that includes an identifier, flashing or blinking light, or other various operational modes that would be apparent to a skilled artisan after having the benefit of this disclosure. The controller 20 may then control the light source 40 to emit light in accordance with the mode of operation, as determined by analyzing the data (Block 232). The operation may then terminate at Block 234. The skilled artisan will appreciate that the light source may be operated in many different ways. Embodiments of the present invention specifically contemplate operation of the light source by dimming the light source and by moving the light source between an on position and an off position.

Figure 6:
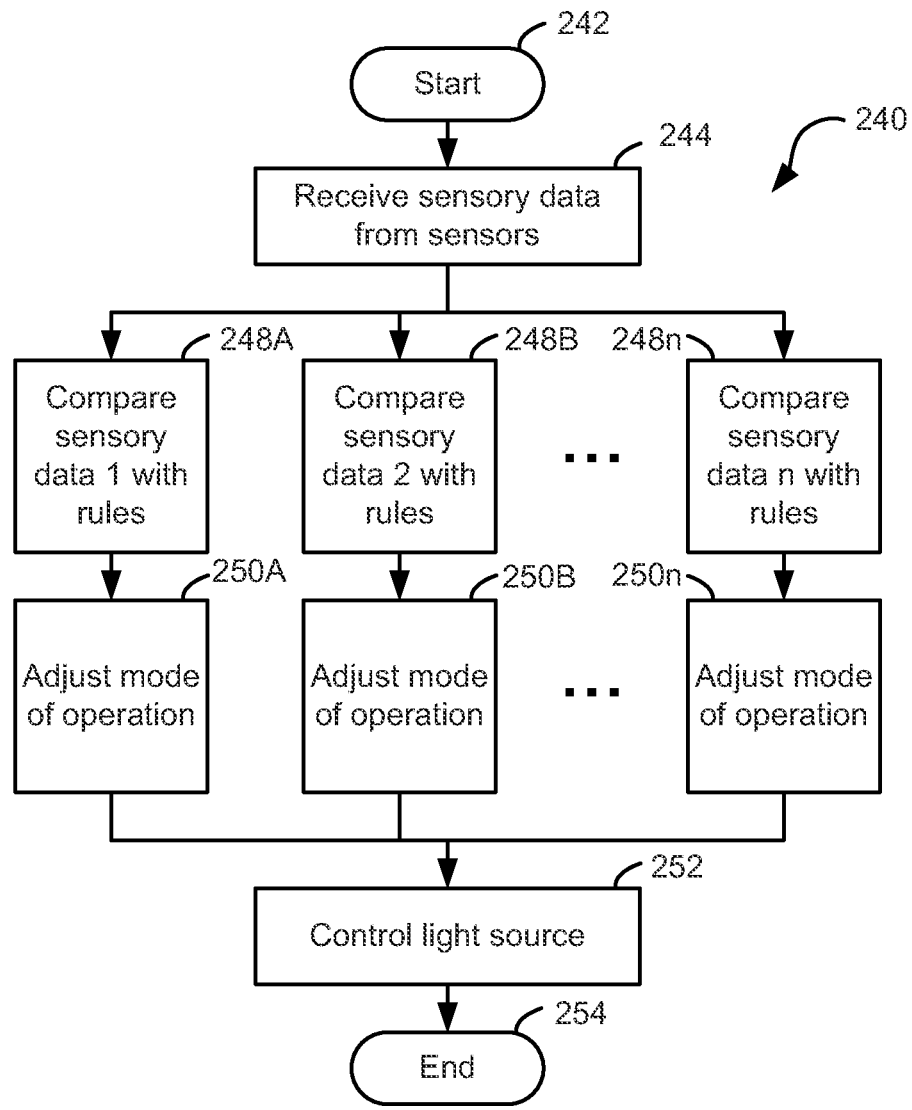
FIG. 6 is a flowchart illustrating an analysis of sensory data from a plurality of sensors and controlling a light source, according to an embodiment of the present invention.
Figure 7:
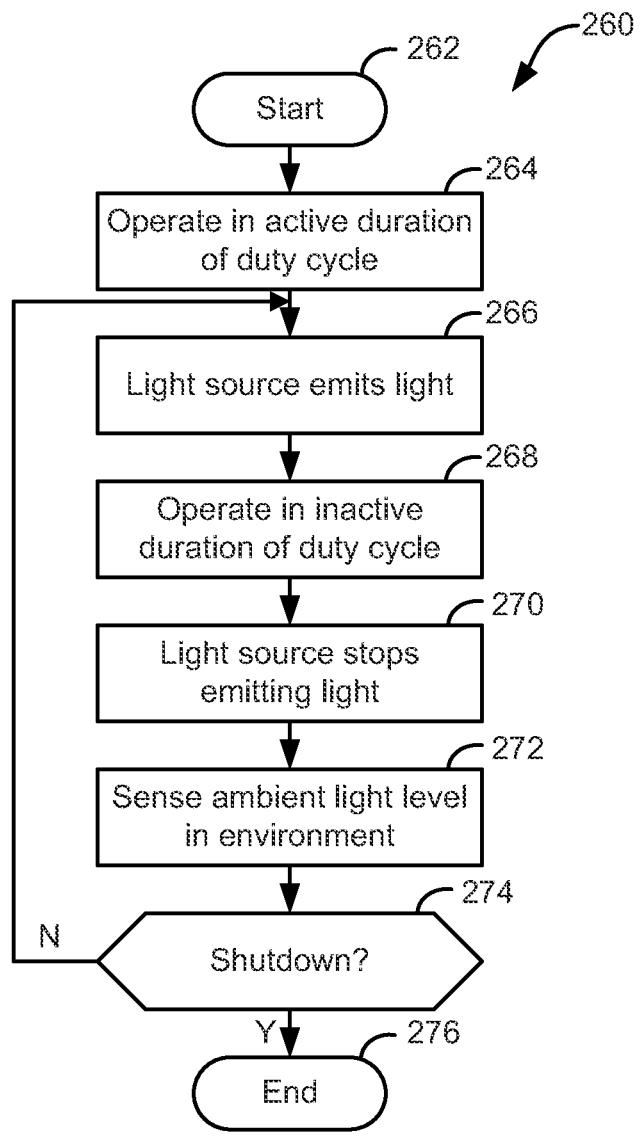
FIG. 7 is a flowchart illustrating an operation of a light source with a duty cycle, according to an embodiment of the present invention.

Referring now to flowchart 240 of FIG. 6, the operation of the controller 20 communicative connected to a plurality of sensors 50, according to an embodiment of the present invention, will now be discussed in greater detail. Starting at Block 242, the controller 20 may receive sensory data from a plurality of the sensors 50 (Block 244). The controller 20 may then retrieve rules from the memory 24 (Block 246). The memory 24 may be included in the controller 20. Alternatively, the memory 24 including at least some of the rules may be operatively connected to the controller 20 and accessible by the controller 20.

The controller 20 may then analyze the data, for example, by comparing the sensory data with the rules, respective to each of the plurality of sensors 50 from which data has been received (Block 248A, 248B, . . . , 248n). After the data from the plurality of sensors 50 has been analyzed, the controller 20 may adjust the mode of operation of the luminaire 10, respective to the analysis performed on the data that may have been received by each of the plurality of sensors (Block 250A, 250B, . . . , 250n). Various modes, according to an embodiment of the present invention, may include full output, limited output, emission of light that includes data, emission of light that includes an identifier, flashing or blinking light, or other various operational modes that would be apparent to a skilled artisan after having the benefit of this disclosure. The controller 20 may then control the light source 40 to emit light in accordance with the mode of operation, as determined by analyzing the data (Block 252). The operation may then terminate at Block 254.

The controller 20 may control the light source 40 to emit light with a duty cycle. The duty cycle may include an active duration and an inactive duration. During the active duration, the light source 40 may emit light. Conversely, during the inactive duration, the light source 40 may not emit light. The controller 20 may control the light source 40 to emit or to not emit light during the active and inactive durations of the duty cycle, respectively.

As discussed in greater detail above, one of the sensors 50 may be an ambient light detector 54 (see FIG. 1). Referring now to flowchart 260 of FIG. 7, operation of the ambient light detector 54 of the luminaire 10 according to an embodiment of the invention will now be discussed in greater detail. Generally, the ambient light detector 54 may detect ambient light levels in an inactive portion of the duty cycle. This discussion of an ambient light detector 54 being one of the sensors 50 of the luminaire 20 is provided as an example, and is not intended to limit the present invention in any way.

Starting at Block 262, the light source 40 may be operating in the active duration of the duty cycle (Block 264). During the active duration, one or more light sources 40 may emit light (Block 266). Skilled artisans will appreciate that beginning this example with the light source 40 operating in the active or inactive duration of the duty cycle was made in the interest of clarity, and without the intent to limit the present invention. Accordingly, the present invention contemplates that this operation may begin with operation the light source in the inactive duration of the duty cycle.

The luminaire 10 may then change to operation in the inactive duration of the duty cycle (Block 268). During the inactive duration, one or more light sources 40 may stop emitting light (Block 270). The ambient light detector 54 may then detect the ambient light level in the environment (Block 272). Since light is not being emitted by the light sources 40 during the inactive duration of the duty cycle, the ambient light sensor 50 may detect ambient light levels in the environment without interference from the light emitted by one or more light source 40.

It may then be determined whether a shutdown command has been received by the controller 20 for the ambient light detector 54 at Block 274. A shutdown command may be issued, for example, as a result of a configuration of the rules using the interface 30. If no shutdown command has been received at Block 274, the light source may continue to operate at Block 266, wherein the light source 40 emits light while operating in the active duration of the duty cycle. Conversely, if a shutdown command is received at Block 274, the operation may terminate at Block 276. Effectively, the duty cycle may continually loop until a shutdown command is received.

Referring now to flowchart 300 of FIG. 8, along with the signal 280 of FIG. 9, the inclusion of an identifier in light or an auxiliary signal will now be discussed. In the following example, in the interest of clarity, inclusion of a light identifier in light will be discussed. Skilled artisans will appreciate similar operation for inclusion of an identifier in other signals, such as an auxiliary signal identifier being included in the auxiliary signal. Starting at Block 302 of flowchart 300, the controller 20 may generate a digital identifier code (Block 304). The digital identifier code is also referred to as a digital watermark. The controller 20 may control the light source 40 to emit the digital identifier code in the light (Block 306).

Referring additionally to the signal 280 of FIG. 9, an illustrative identifier will now be discussed. The identifier light 282 may be emitted by alternating the emission 286 and non-emission 288 of light in a pattern to indicate a digital signature, as will be appreciated by skilled artisans. For example, a luminaire 10 may be encoded with a serial number, which may be transmittable as the identifier in the light 282. The controller 20 may include the identifier in the light at an interval, such as every minute, to identify the source of the light. In the example presented by the signal 280, without limitation, the identifier may be interpreted by another device as "0011 0011 1010 0011 0010."

Figure 8:
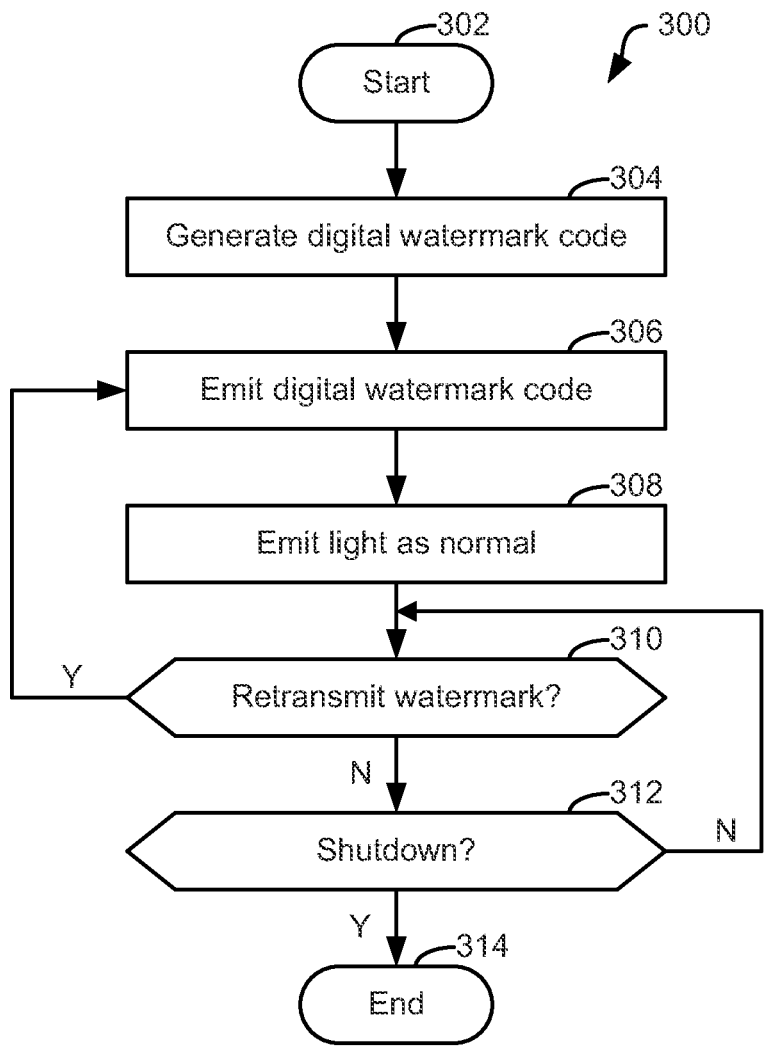
FIG. 8 is a flowchart illustrating an inclusion of an identifier in a signal, according to an embodiment of the present invention.
Figure 9:
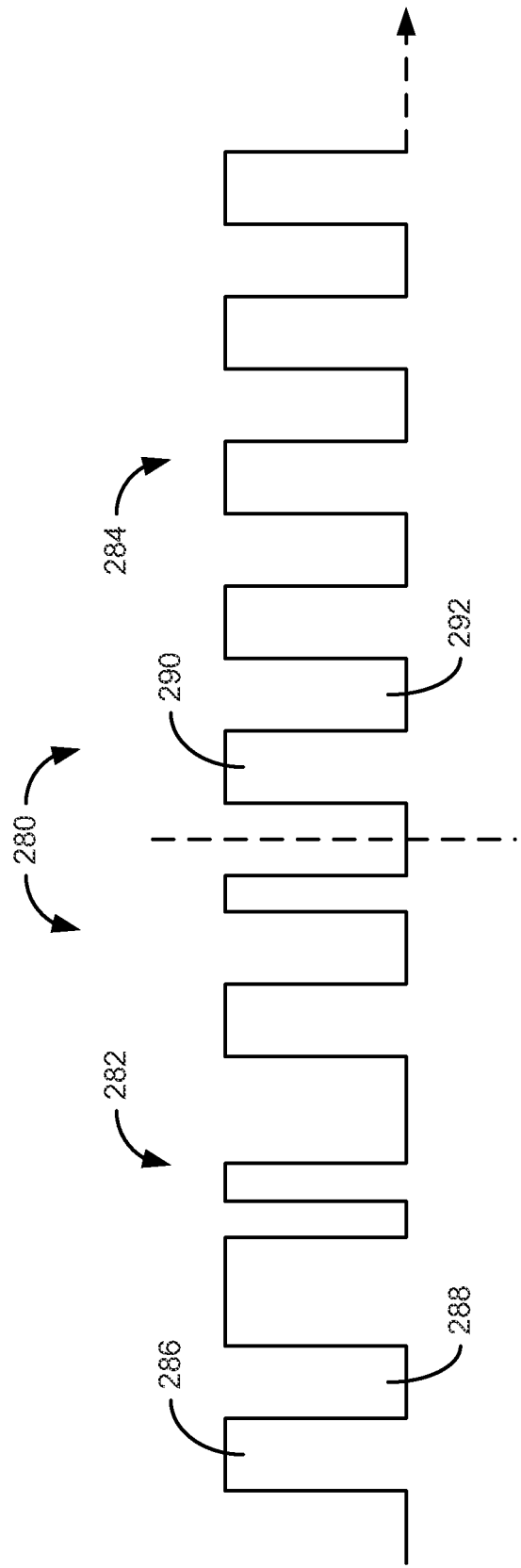
FIG. 9 is a diagram illustrating inclusion of a light identifier in a light signal, according to an embodiment of the present invention.

After the light including the light identifier has been emitted, the light source 40 may emit light with a standard, or otherwise defined, duty cycle, as illustrated, for example, at Block 308 of FIG. 8. Referring additionally to FIG. 9, light emitted without inclusion of an identifier light 284 may include a duty cycle that alters between the active duration 290 and the inactive duration 292. The controller 20 may then determine if it should control the light source 40 to retransmit the light identifier, as illustrated at Block 310 of FIG. 8. If retransmission of the identifier is desired, the light source 40 may again emit the digital identifier code in the light (Block 306).

Conversely, if retransmission of the identifier is not desired at Block 310, the controller 20 may determine whether a shutdown command has been received at Block 312. If no shutdown command has been received at Block 312, the controller 20 may continue to emit light as normal. If a shutdown command has been received at Block 312, the operation may terminate at Block 314.

The luminaire 10, according to an embodiment of the present invention, may emit multiple signals that include multiple identifiers. The multiple identifiers may correlate the multiple signals. Additionally, the multiple signals may be transmittable substantially simultaneously, such that analysis on the transmission and or receipt of the signals may be performed by the controller 20.

Figure 10:
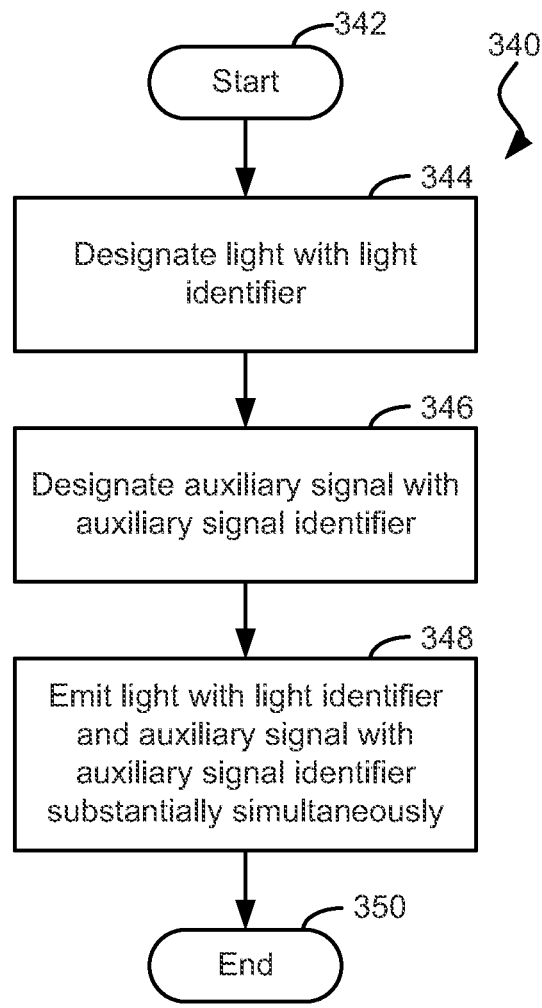
FIG. 10 is a flowchart illustrating emission of signals with identifiers to determine a spatial awareness, according to an embodiment of the present invention.

Referring now to flowchart 340 of FIG. 10, the transmission of light with a light identifier and an auxiliary signal with an auxiliary signal identifier will now be discussed. The light and the auxiliary signal allow the luminaire to become spatially aware of an environment in which the luminaire is located. Similarly, the luminaire may use the light and the auxiliary signal to become aware of other objects and devices in the environment. Spatial awareness may include, but should not be limited to, geolocation, positioning, direction finding, and other analytical processes based on the spatial location of the luminaire in an environment.

According to an embodiment of the present invention, without limitation, the auxiliary signal may include acoustic energy. Acoustic energy may include signals with a frequency that is subsonic, audible, or ultrasonic. In the present example, provided in the interest of clarity, the auxiliary signal may be ultrasonic, or a sound with a frequency greater than the upper limits of human hearing. Starting at Block 342, the controller 20 may designate light with a light identifier (Block 344). The controller 20 may also designate an auxiliary signal with an auxiliary signal identifier (Block 346). The light identifier and the auxiliary signal identifier may be correlated with one another.

Skilled artisans will appreciate that the designation of an identifier with light and an auxiliary signal may happen in any order, or substantially simultaneously. After the light has been designated with a light identifier and the auxiliary signal has been designated with an auxiliary signal identifier, the controller 20 may control the light source 40 to emit the light and the auxiliary signal emitter to emit auxiliary signal substantially simultaneously (Block 348). The operation may then terminate at Block 350.

Light, auxiliary signals, and other signals including one or more identifier, may be identifiable by luminaires 10 or other devices. This identification of signals, and an association to its source, may be used to perform analyses on the signals. For example, the detection of identified light by a luminaire 10 that has been emitted by another luminaire 10 in an environment may indicate the presence of a network 62 of luminaires 10. As another example, receiving a plurality of signals associated with a source luminaire 10 may be used to calculate a distance between the devices. Skilled artisans will appreciate the following examples to be provided for illustrative purposes, and without limitation.

Figure 11:
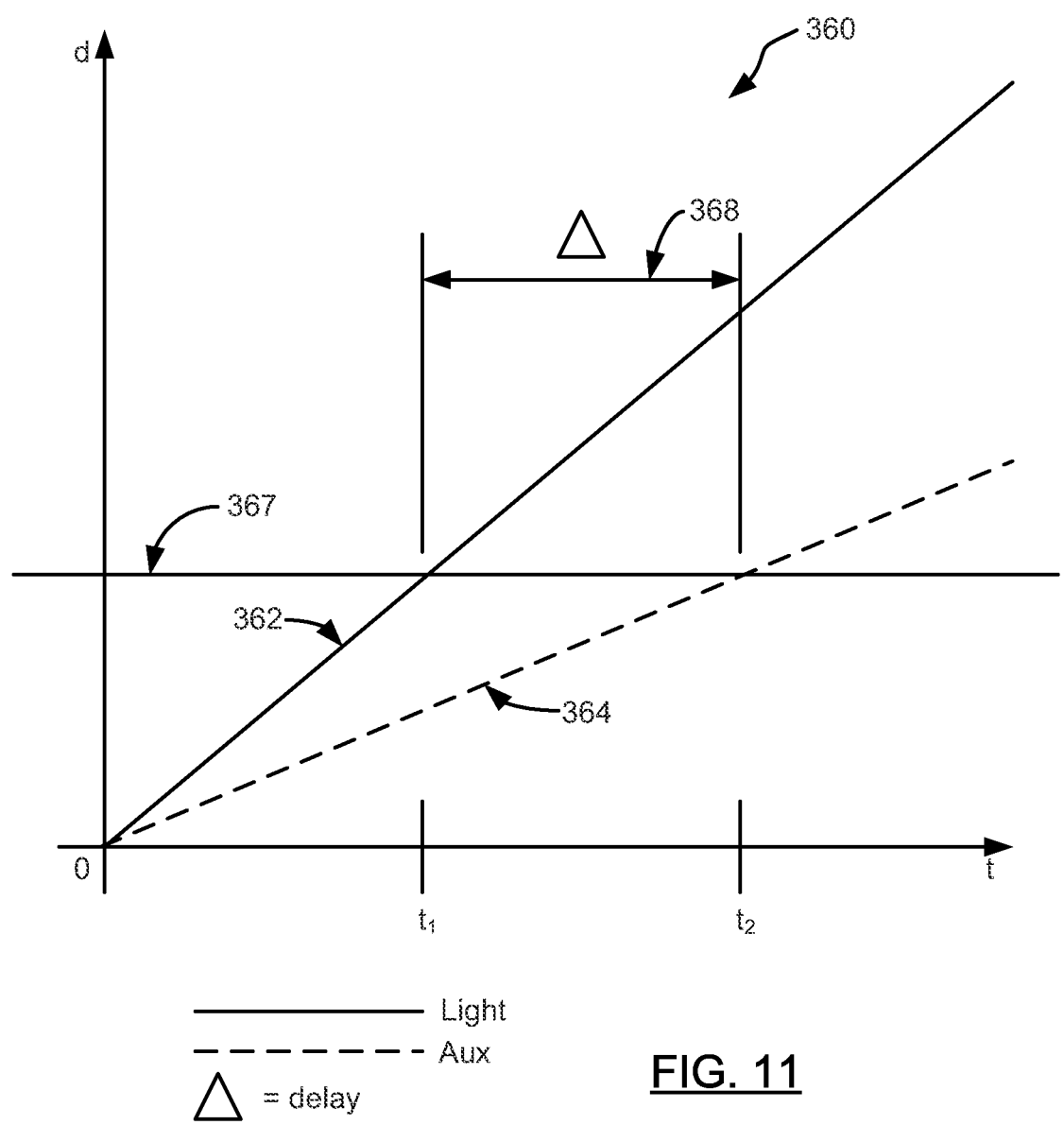
FIG. 11 is a graph illustrating signals emittable by the luminaire with differing velocities, according to an embodiment of the present invention.

Referring now to graph 360 of FIG. 11, the delay created between light 362, represented by a solid line, and an auxiliary signal 364, represented by a broken line, will now be discussed. Graph 360 plots the distance traveled by a signal along the y-axis and the time of travel along the x-axis. A desired travel distance has been indicated by the line labeled 367.

The velocity at which light 362 and the auxiliary signal 364 travels through the environment may differ. For example, light 362 travels at approximately $3 \times 10^8$ meters per second. In the present example, the light 362 may reach the desired travel distance 367 at time $t_1$. As another example, the auxiliary signal 364 may be a signal of acoustic energy, such as an ultrasonic signal that travels at approximately 340 meters per second. In the present example, the auxiliary signal 364 may reach the desired travel distance 367 at time $t_2$.

The difference between $t_1$ and $t_2$ may be a delay represented by the delta range 368. As the distance the light and the auxiliary signals must travel increases, so will the delay between times when the light and an auxiliary signal reaching the desired travel distance 367. This delay may be analyzed to determine the distance of the luminary from another device or object. The other device may be an additional luminaire 10. According to an embodiment of the present invention, multiple luminaires 10 may be included as nodes in a network of nodes 70, each of which being spatially aware with regard to the other nodes in the network of nodes.

Figure 12:
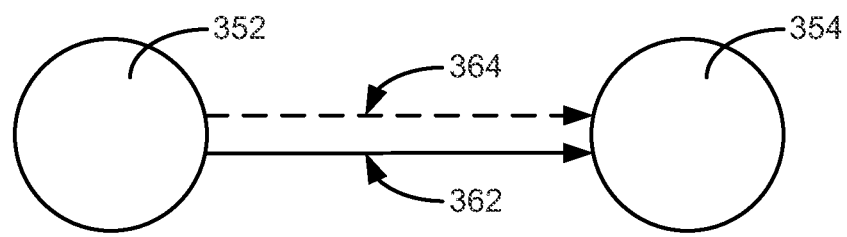
FIG. 12 is a block diagram illustrating signals being received by a luminaire to determine a spatial location, according to an embodiment of the present invention.

Referring now to FIG. 12, an example of acquiring spatial awareness will now be discussed. In FIG. 12, light 362 and an auxiliary signal 364 may be emitted from a first luminaire 352 to be received by a second luminaire 10 354. These signals 362, 364 may be emitted substantially simultaneously from the first luminaire 352. The delay between receiving the light 362 and the auxiliary signal 364 may be calculated by the second luminaire 354 to determine its distance from the first luminaire 352. The delay may be calculated by the controller 20 of the luminaire 354.

Figure 13:
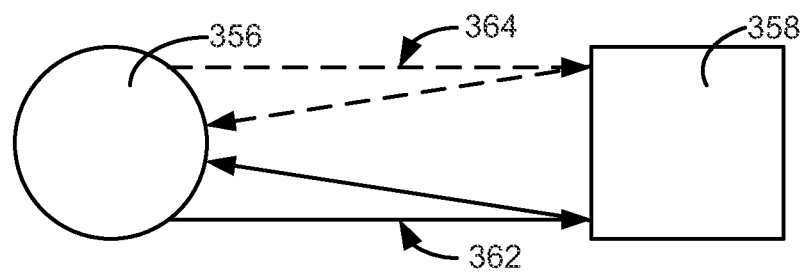
FIG. 13 is a block diagram illustrating signals reflected from an environmental object and being received by a luminaire to determine a spatial awareness, according to an embodiment of the present invention.

Referring now to FIG. 13, an additional example of acquiring spatial awareness will now be discussed. In FIG. 13, light 362 and an auxiliary signal 364 may be emitted from a luminaire 356 into an environment that includes an environmental object 358. The light 362 and the auxiliary signal 364 may be reflected by the object and be received by the luminaire 356. The luminaire 356 may then calculate the delay between the emission and the detection of the light 362 and the auxiliary signal 364 to determine the distance of the environmental object 358 from the luminaire 356. The luminaire 356 may take in account the additional delay caused by the initial transmission and reflective transmission of the signals 362, 364 to and from the environmental object 358, respectively. A person of skill in the art will appreciate additional configurations of luminaires 10, environmental objects 358, and other devices that would allow the luminaire 10 to be spatially aware after having the benefit of this disclosure.

Figure 14:
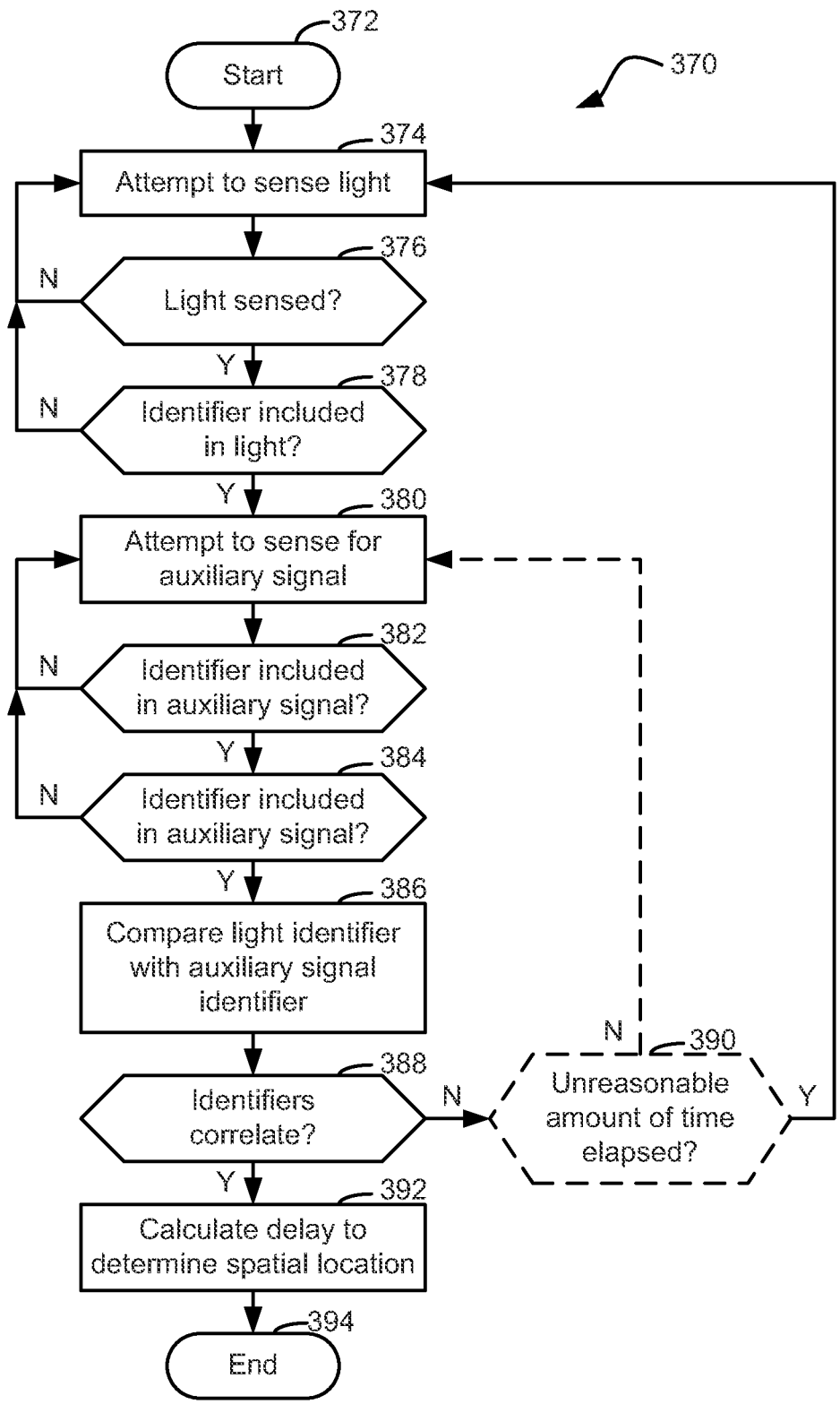
FIG. 14 is a flowchart illustrating a comparison of signals to determine a spatial awareness, according to an embodiment of the present invention.

Referring now to flowchart 370 of FIG. 14, an illustrative operation of calculating a delay between two signals will now be discussed. Starting at Block 372, the luminaire 10 may attempt to sense light (Block 374). The light may be sensed by a sensor 50 communicatively connected the controller 20. The controller 20 may then determine whether light is sensed (Block 376). Embodiments of the present invention contemplate use of an algorithm to conduct a delay/distance calculation. If light is sensed at Block 376, the controller 20 may determine if a light identifier is included in the light (Block 378). If no light is sensed at Block 376, or if light is sensed that does not include a light identifier, the luminaire 10 may continue attempting to sense light (Block 374).

If a light identifier is sense in the light, the luminaire 10 may attempt to sense an auxiliary signal, such as an ultrasonic signal (Block 380). The auxiliary signal may be sensed by a sensor 50 communicatively connected the controller 20. The controller 20 may determine whether an auxiliary signal is sensed (Block 382). If an auxiliary signal is sensed at Block 382, the controller 20 may determine if an auxiliary signal identifier is included in the auxiliary signal (Block 384). If no auxiliary signal is sensed at Block 382, or if auxiliary signal is sensed that does not include an auxiliary signal identifier, the luminaire 10 may continue attempting to sense an auxiliary signal (Block 380).

After light with a light identifier and an auxiliary signal with an auxiliary signal identifier that has been sensed, the controller 20 may compare the identifiers for the light and the auxiliary signal (Block 386). The controller 20 may then determine if the identifiers correlate at Block 388. Embodiments of the present invention contemplate synchronization of the signals. This can be accomplished using time stamps, for example, that may be embedded in the signals.

If it is determined that the identifiers do not correlate at Block 388, the controller 20 may optionally determine if an unreasonable amount of time has elapsed (Block 390). An unreasonable amount of time may be relative to a time period wherein a delay between receiving light with a light indicator and an auxiliary signal with a correlating auxiliary signal indicator would be unreasonable given the space of the environment. Unreasonableness of time may be defined in the rules. Unreasonableness of time may also be defined or configured by a user, for example, using the interface 30.

If it is determined that an unreasonable amount of time has not elapsed at Block 390, the operation may again attempt to sense an auxiliary signal at Block 380. If it is determined that an unreasonable amount of time has elapsed at Block 390, the operation may again attempt to sense light at Block 374, essentially restarting. If it is determined at Block 388 that the light identifier and the auxiliary signal identifier correlate, the controller 20 may calculate the delay between receiving the identified signals to determine a distance from the origin of the signals, and thus the spatial location of the luminaire 10 (Block 392). The operation may terminate at Block 394.

As previously mentioned, components included in the luminaire 10 may be included as a node within a network 62, such as a network of nodes 70. The luminaire 10 may communicate with one or more additional luminaires 10 over the network 62. In an embodiment, luminaires 10 and additional devices may be connected over the network 62 69 by using a centralized hub or outer. In an additional embodiment, each device on the network 62 69 may be included in a network of nodes 70, for example, and without limitation, a neural network 62. A node may include a sensor, a controller 20, and additional components of the luminaire 10 such as a light source 40 and/or an auxiliary signal emitter. The components of the node may be included in a luminaire 10. Each node may operate as a master and a slave. Additionally, each node may act as a repeater to expand the range of the network 62 69.

Figure 15:
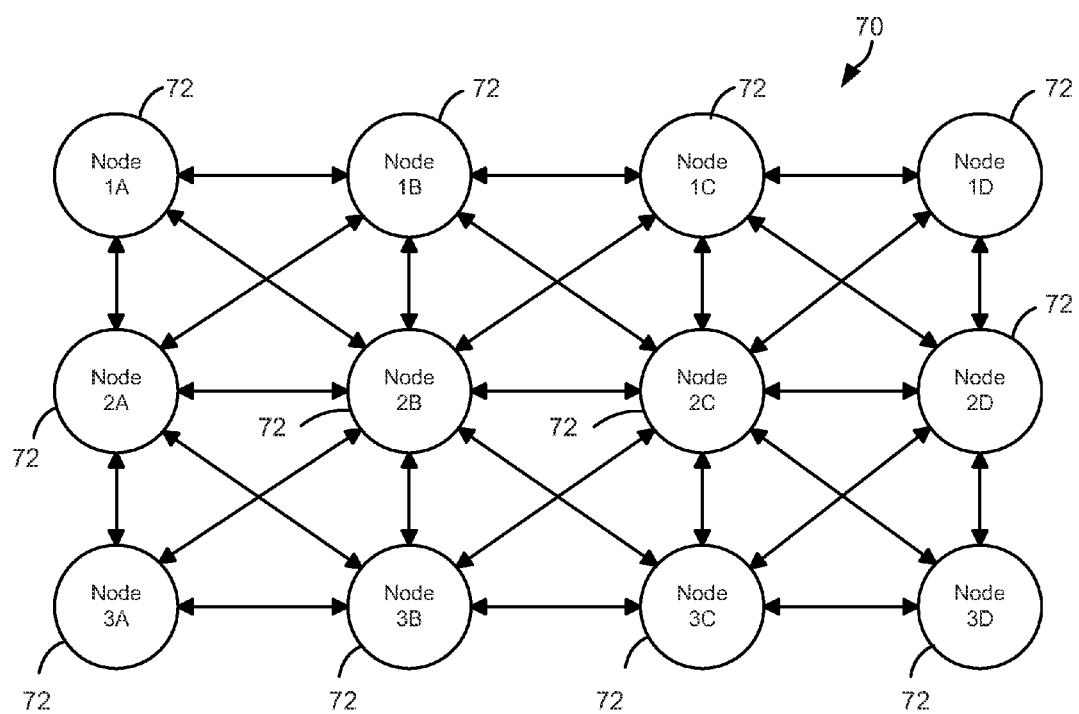
FIG. 15 is a schematic diagram illustrating a network of nodes, according to an embodiment of the present invention.
Figure 16:
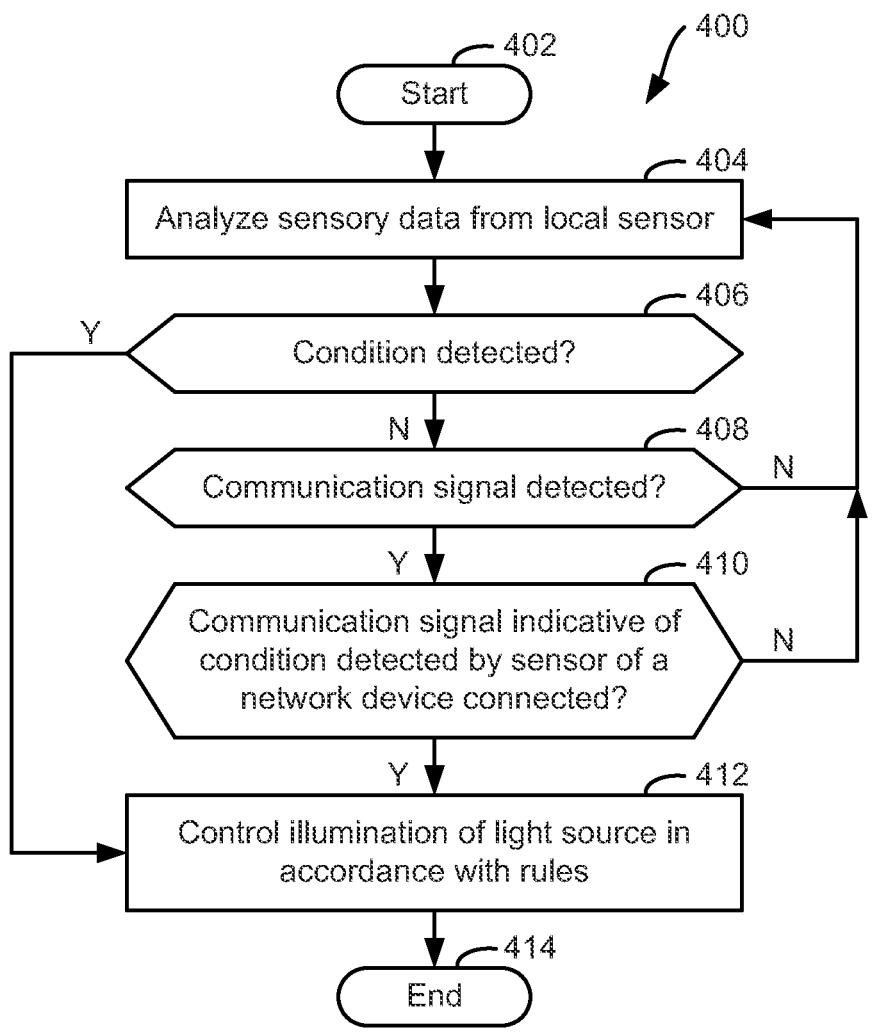
FIG. 16 is a flowchart illustrating an analysis of sensory data sensed by a sensor and a network connected device, according to an embodiment of the present invention.
Figure 17:
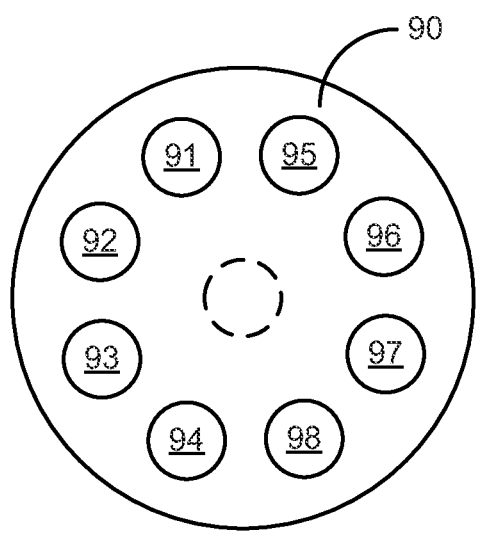
FIG. 17 is a schematic diagram illustrating an interface, according to an embodiment of the present invention.

Referring now to FIG. 15, an illustrative embodiment to a network of nodes 70 will now be discussed. In this embodiment a plurality of nodes may be positioned within communication range of additional nodes. A person of skill in the art will appreciate that the configuration of nodes illustrated in FIG. 15 has been chosen in the interest of clarity, as the nodes may be configured in a plethora of additional locations relative to one another.

As additional nodes are added to the neural network 62, the range of the network 62 may be expanded. In the network of nodes 70 illustrated by FIG. 15, each node may communicate with its neighboring nodes by sending and receive data directly with one another. For example, Node 2A may transmit a direct data communication as a master to be received by Node 2B as a slave. This data communication may not require involving additional nodes 72. However, additional nodes 72 may still receive the data communication, analyze any information included in the data communication, and disregard any message to which the additional node 72 is not an intended recipient. A person of skill in the art will appreciate that communication of a node 72 with a non-neighboring node 72 is also contemplated by the scope of the present invention, and is intended to be included in this disclosure.

In an additional embodiment, nodes 72 may be configured to repeat messages that are addressed to another node 72 in the network of nodes 70. For example, Node 2A may intend to transmit a data communication as a master to Node 1C as a slave. Node 2A may broadcast the data transmission, even though Node 1C is out of range to receive the transmission. However, the data may be received by Node 2B as a slave, which may be in range of Node 2A. After analyzing the data transmission, Node 2B may determine that it is an unintended recipient, Node 2B may then retransmit the data communication as the master, which may now be received by Node 1C as the slave, since Node 1C may now be in range of the transmitting master node.

Additionally, the controller 20 at each node may include memory 24. The memory 24 of the node may maintain an at least partial log of data communication 80 that have been transmitted, received, and or rebroadcast by the node 72. In this embodiment wherein the network of nodes 70 is a neural network, upon receipt of a data communication, the controller 20 of a node 72 may then access the memory 24 to compare the data included in the memory of that node 72 with the received data. The controller 20 of the node 72 may then make a logic based decision as a result of the analysis. An example of such a logic based decision may include declining to rebroadcast a data communication that has already been rebroadcast by the node 72. An additional example of a logic based decision may include broadcasting a confirmation signal to a transmitting master node, such as node 3B, indicating that the data transmission has been received from Node 3C. In this example, the Node 3C transmitting the data communication as a master node may receive the confirmation signal from Node 3B as a slave node. Node 3C may then analyze the confirmation signal to make a logic based decision to terminate further transmission of the original data communication.

As nodes 72 are added to the network of nodes 70, each node 70 may receive and transmit multiple signal and data transmissions among each other. These signals may include, for example, the light and auxiliary signal transmissions usable to determine the spatial awareness between the nodes within the network of nodes 70. As the nodes 72 become aware of one another, and as data is shared between the nodes 72, advanced analysis of the data detected by the sensors 50 of each node 72 may be performed. Examples of such advanced analysis may include concatenation of the sensed environmental conditions with respect to the spatial location of each node 72. This concatenation may create a map of conditions sensed throughout the environment, for example.

The sharing of data between nodes 72 within the network of nodes 70 may additionally allow a controller 20 of one node 72 analyze a condition sensed by another node 72. An example of this distributed sensing, using both sensors 50 locally included within a node and distributed through a network of nodes 70, will now be discussed with reference to flowchart 400 of FIG. 16. Skilled artisans will appreciate that the following example is but one embodiment of the present invention, and thus should not be viewed as limiting.

Starting at Block 402, the controller 20 may analyze sensory data from a local sensor, or a sensor 50 directly connected to the controller 20 (Block 404). The controller 20 may then determine if a condition was detected by the local sensor (Block 406). If a condition was detected, the operation may advance to Block 412, wherein the controller 20 may control the light source 40 respective to the sensed conditions, as may be defined by the rules.

If a condition is not detected at Block 406, the controller 20 may determine whether a communication signal is detected (Block 408). A communication signal may be any signal that carries a communication from another device, such as an additional luminaire 10 that may be a node 72 in the network of nodes 70. If no communication signal is detected at Block 408, the operation may return to Block 404, wherein the controller 20 may analyze sensed data from a local sensor. If a communication signal is detected at Block 408, the controller 20 may determine whether the communication signal is indicative of a condition detected by a sensor 50 of a network 62 connected device (Block 410). The network 62 connected device may be another luminaire 10 within the network 62.

If the signal is not determined to be indicative of a condition detected by a sensor 50 of a network 62 connected device at Block 410, the operation may return to Block 404, wherein the controller 20 may analyze sensed data from a local sensor. If the signal is determined to be indicative of a condition detected by a sensor 50 of a network 62 connected device at Block 410, the operation may advance to Block 412, wherein the controller 20 may control the light source 40 with respect to the sensed conditions, as may be defined by the rules. The operation may then terminate at Block 414.

In an embodiment of the present invention, as mentioned above, the luminaire 10 may include a network interface 60. The luminaire 10 may communicate with network connected over a network 62 devices using the network interface 60. Such communications may include receiving control instructions, firmware updates, or other data instructions that may affect the operation of the luminaire 10 of the present invention. The network interface 60 may also allow the luminaire 10 to transmit a data signal to a connected network device. Such data signals may include feedback information, status updates, identity, and other information detected by the luminaire 10.

An embodiment of a network 62 connected device may include a computerized device capable of running computer programs. More specifically, the computerized network connected device may be connected to the network 62 to perform one or more analyses, which may result in the determination of operational statistics based at least partially upon feedback by the luminaire 10. The network connected device may include, but should not be limited to, a server, a computer (i.e., desktop computer, laptop computer, netbook computer, or any machine having a processor), a dumb terminal that provides an visual interface with a computer or server, a personal digital assistant, mobile communications device such as a cellular phone, smart phone (such as an Google Android based phone), or other similar device that provides computer or quasi-computer functionality.

The network 62 communication may occur through an internal network 62, an intranet, LAN, WAN, or global communications network 62 (such as the Internet). It should be noted that the method aspects of the present invention are preferably computer-implemented methods and, more particularly, at least one step is preferably carried out using a computerized device.

The analyses by the controller 20 may be performed as defined by the rules, which are storable in the memory 24. The rules may be compared to data or other information to determine the operation of the luminaire 10. The rules may also define the modes in which the luminaire 10 operates, sensitivity of the sensors, which of the modes should affect operation of the luminaire 10, and other operation parameters that may relate to the operation of the luminaire 10. Those skilled in the art will appreciate that the controller 20 of the luminaire 10 according to an embodiment of the invention is capable of several other functions, and that the above described functions are exemplary in nature and not intended to be limiting in any way.

The rules may be definable by a user. In an embodiment of the present invention, the rules may be definable using an interface 30. The structure of an illustrative interface 30 has been discussed above. The interaction with the interface 30 to define and manipulate the rules will now be discussed in the following examples, presented without the intent to limit the present invention in any way.

Referring back to FIGS. 1-2, the interface 30 may include a number of inputs 32 manipulable by a user. In the following examples, referring additionally to FIG. 17, an illustrative interface 90 including eight inputs 91-98 will be discussed. Skilled artisans will appreciate that more or less inputs may be included and remain within the scope and spirit of the present invention. Also, in some of the following embodiments, a threshold duration value will be discussed. This threshold duration value is simply a variable quantity of time that may be predetermined or otherwise determined by a user. Additional embodiments will be apparent to a person of skill in the art after having the benefit of this disclosure.

Also, some of the following examples may include one or more steps wherein the luminaire 10 will provide feedback. These steps are optional. Feedback may be provided by emitting light from a light source 40, emitting a sound, or otherwise providing an indication that an input has been received. Furthermore, the following examples include configurations wherein two inputs 32 are manipulated to interact with the interface 30. A person of skill in the art appreciate that as few as one input 32 and as many as a virtually limitless number of inputs 32 may be manipulated within the scope of the present invention.

Figure 18:
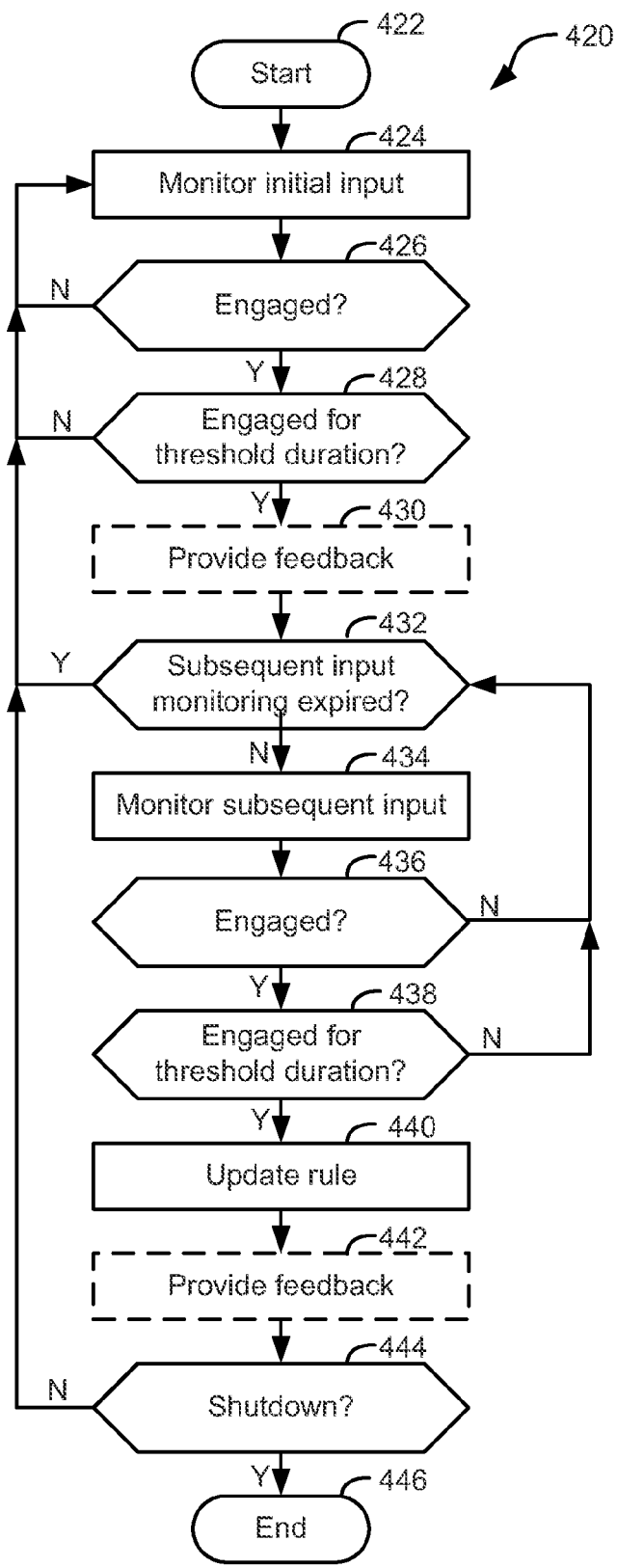
FIG. 18 is a flowchart illustrating use of the interface of FIG. 17 to manipulate rules, according to an embodiment of the present invention.

Referring now to flowchart 420 of FIG. 18, modification of a rule, such as, for example, a delay between the detection of motion in the environment and illumination will now be discussed generally. Starting at Block 422, the controller 20 may monitor an initial input (Block 424). The initial inputs are illustrated as inputs 91-94 on the illustrative interface 90 of FIG. 17. The controller 20 may then determine if the initial input has been engaged at Block 426.

If the initial input has been engaged, the controller 20 may determine whether the initial input was engaged for a threshold duration (Block 428). If the initial input has not been engaged, or has been engaged for a duration less than the threshold duration, the operation may return to Block 424 wherein the controller 20 will continue to monitor the initial input. If it is determined at Block 428 that the initial input has been engaged for the threshold duration, the luminaire 10 may optionally provide feedback that the initial input has been properly engaged (Block 430). Those skilled in the art will appreciate that making the determination of whether or not the input has been engaged for the threshold duration advantageously prevents the inadvertent transmission of a signal upon an accidental engagement of one of the inputs. Those skilled in the art will further appreciate that the present invention contemplates transmitting a signal upon any engagement of the inputs and that the threshold duration may advantageously be manipulable for any desired duration, i.e., a minimal or no duration, to any desired length of duration.

Once the initial input has been engaged, as described above, the controller 20 may determine whether the period in which the subsequent input should be monitored has expired (Block 432). The subsequent inputs are illustrated as inputs 96-98 on the illustrative interface 90 of FIG. 17. The first time the operation makes this determination, the period will likely not have expired. If the period in which the subsequent input should be monitored has expired, the operation may return to Block 424, wherein the initial input will again be monitored. If the period in which the subsequent input should be monitored has not expired at Block 432, the controller 20 may then monitor a subsequent input (Block 434).

The determination may then be made whether the initial input has been engaged at Block 436. If the subsequent input has been engaged, the determination may be made whether the subsequent input has been engaged for a threshold duration (Block 438). If the subsequent input has not been engaged, or has been engaged for a duration less than the threshold duration, the operation may return to Block 432 wherein a determination may again be made whether the period in which the subsequent input should be monitored has expired. Similar to the description of engaging the input above, embodiments of the present invention contemplates engaging the subsequent input for any duration, and that monitoring the duration may be optional, i.e., embodiments of the present invention contemplates that the signal may be transmitted upon immediate engagement of the input or upon engagement of the input for a duration.

If it is determined at Block 438 that the subsequent input has been engaged for the threshold duration, the operation may update the rule accordingly (Block 440). The luminaire 10 may optionally provide feedback that the rule has been successfully updated (Block 442). As indicated above, the feedback may be in any form, i.e., and audible feedback or a visual feedback. Those skilled in the art will appreciate that the feedback may be provided by sending a signal through the network that may result in delivery of a message indicating that the rule has been successfully updated. For example, it is contemplated that the feedback may result in delivery of an email, a text message, an instant message, or any other readily transmittable message that indicates that the rule has been successfully updated.

The controller 20 may then determine if a shutdown command has been received at Block 444. If no shutdown command has been received, the operation may return to Block 424, wherein the initial input will again be monitored. If a shutdown command has been received at Block 444, the operation may terminate at Block 446. A person of skill in the art will appreciate that this operation may be repeated for additional subsequent inputs.

Figure 19:
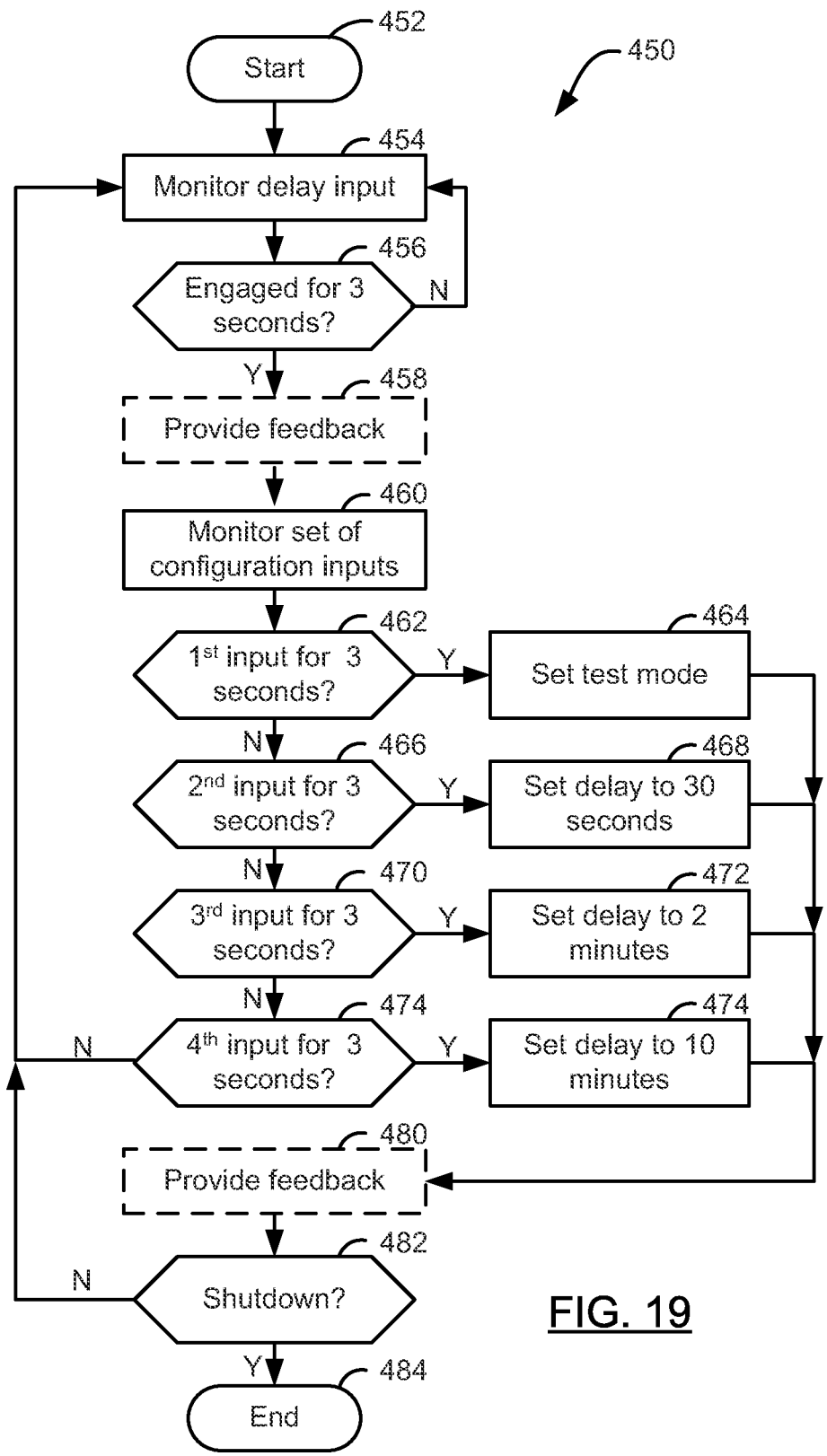
FIGS. 19-22 are flowcharts illustrating examples of using the interface illustrated in FIG. 17 to manipulate rules, according to an embodiment of the present invention.

Referring now to flowchart 450 of FIG. 19, a specific modification of a delay between the detection of motion in the environment and illumination using the interface 30 will now be discussed, without limitation. Starting at Block 452, the controller 20 may monitor a delay input (Block 454). The controller 20 may then determine if the delay input has been engaged for a threshold duration, such as three seconds (Block 456). If the delay input has not been engaged for the threshold duration, the operation may return to Block 454 wherein the controller 20 will continue to monitor the delay input. If it is determined at Block 456 that the delay input has been engaged for the threshold duration, the luminaire 10 may optionally provide feedback that the delay input has been properly engaged (Block 458).

Once the delay input has been properly engaged, the controller 20 may monitor a set of configuration inputs (Block 460). The set of configuration inputs may include one or more inputs that may be engaged by a user to manipulate the rules. Although the following example discusses four configuration inputs, a person of skill in the art will appreciate that any number of configuration inputs may be included in the set of configuration inputs, without limitation.

In determining if a configuration input has been engaged, the controller 20 may determine if a first input has been engaged for a threshold duration (Block 462). If it is determined at Block 462 that the first input has been engaged for the threshold duration, the rule relating to the delay may be defined to operate in test mode (Block 464). During test mode, the luminaire 10 may operate such that no delay is required and the luminaire 10 will react immediately to illuminate an environment with and without and motion in the field of view.

If the first input has not been engaged for the threshold duration, for example three seconds, the operation may proceed to Block 466 wherein the controller 20 may determine whether a second input has been engaged for a threshold duration. If it is determined at Block 466 that the second input has been engaged for the threshold duration, the rule relating to the delay may be defined to operate with a delay between detecting motion and emitting light being defined as thirty seconds (Block 468). With the delay being defined as thirty seconds, the luminaire 10 may operate such to illuminate an environment in which motion is detected in the field of view for thirty seconds.

If the second input has not been engaged for the threshold duration, for example three seconds, the operation may proceed to Block 470 wherein the controller 20 may determine whether a third input has been engaged for a threshold duration. If it is determined at Block 470 that the third input has been engaged for the threshold duration, the rule relating to the delay may be defined to operate with a delay between detecting motion and emitting light being defined as two minutes (Block 472). With the delay being defined as two minutes, the luminaire 10 may operate such to illuminate an environment in which motion is detected in the field of view for two minutes.

If the third input has not been engaged for the threshold duration, for example three seconds, the operation may proceed to Block 474 wherein the controller 20 may determine whether a fourth input has been engaged for a threshold duration. If it is determined at Block 474 that the fourth input has been engaged for the threshold duration, the rule relating to the delay may be defined to operate with a delay between detecting motion and emitting light being defined as ten minutes (Block 476). With the delay being defined as ten minutes, the luminaire 10 may operate such to illuminate an environment in which motion is detected in the field of view for ten minutes.

If the fourth input has not been engaged for the threshold duration, for example three seconds, the operation may proceed to Block 454, wherein the controller 20 may again monitor whether the delay input has been engaged.

If the rules have been defined in Blocks 464, 468, 472, or 476, the luminaire 10 may optionally provide feedback that the rule has been successfully changed (Block 480). The controller 20 may then determine if a shutdown command has been received at Block 482. If a shutdown command has not been received at Block 482, the operation may proceed to Block 454, wherein the controller 20 may again monitor whether the delay input has been engaged. If a shutdown command has been received at Block 482, the operation may terminate at Block 484.

Figure 20:
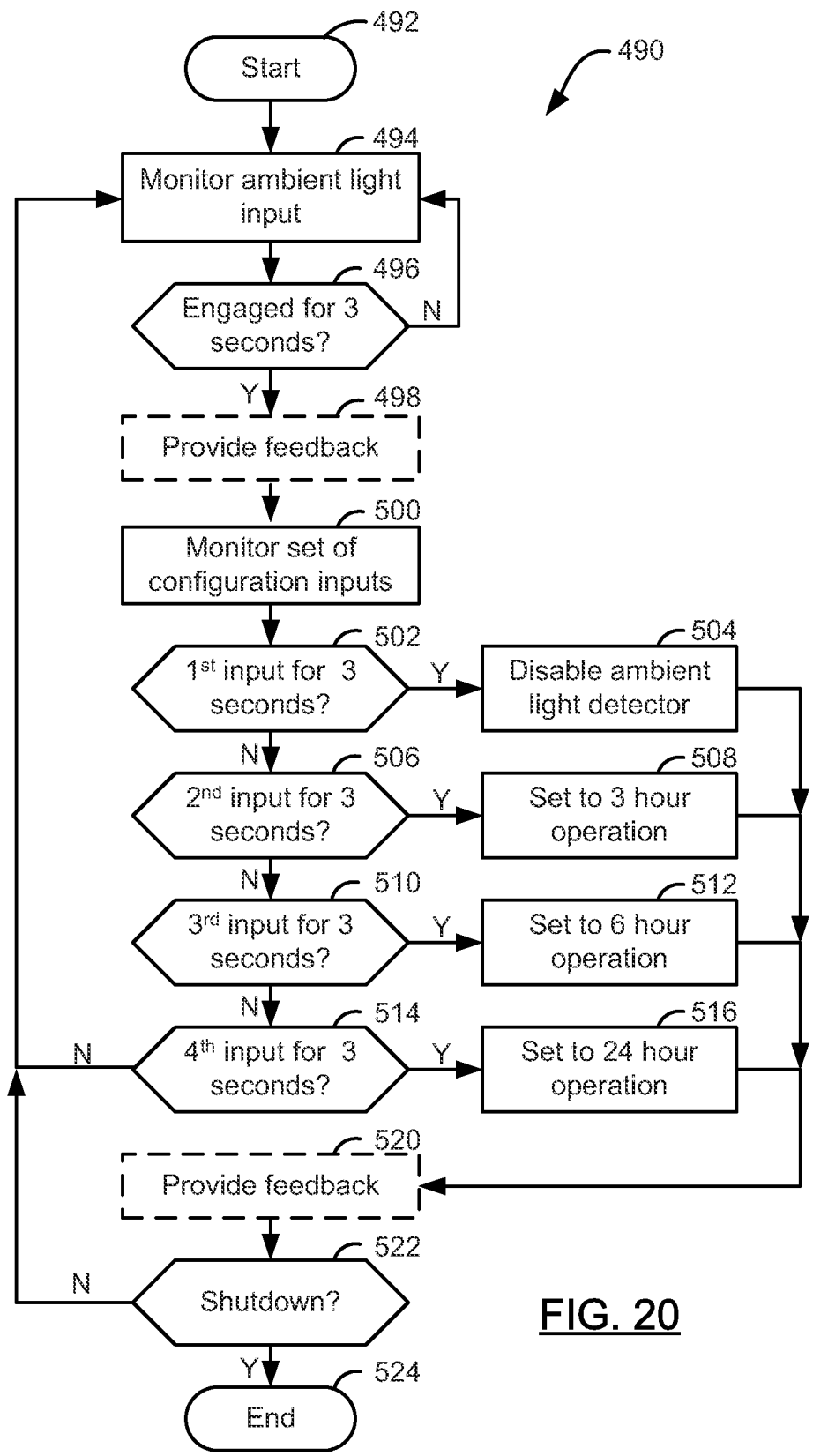

Referring now to flowchart 490 of FIG. 20, a specific modification of the ambient light detector 54 using the interface 30 will now be discussed, without limitation. Starting at Block 492, the controller 20 may monitor an ambient light detector input (Block 494). The controller 20 may then determine if the ambient light detector input has been engaged for a threshold duration, such as three seconds (Block 496). Again, a threshold duration of three seconds (as illustrated in the flowchart 490) is exemplary in nature and not meant to be limiting in any way. The threshold duration can be any duration, and a reading that the threshold duration is limited to three seconds is inappropriate and not intended in any way. If the ambient light detector input has not been engaged for the threshold duration, the operation may return to Block 494 wherein the controller 20 will continue to monitor the ambient light detector input. If it is determined at Block 496 that the ambient light detector 54 input has been engaged for the threshold duration, the luminaire 10 may optionally provide feedback that the ambient light detector input has been properly engaged (Block 498).

Once the ambient light detector 54 input has been properly engaged, the controller 20 may monitor a set of configuration inputs (Block 500). The set of configuration inputs may include one or more inputs that may be engaged by a user to manipulate the rules. Although the following example discusses four configuration inputs, a person of skill in the art will appreciate that any number of configuration inputs may be included in the set of configuration inputs, without limitation.

In determining if a configuration input has been engaged, the controller 20 may determine if a first input has been engaged for a threshold duration (Block 502). If it is determined at Block 502 that the first input has been engaged for the threshold duration, the rule may be defined to disable the ambient light detector 54 (Block 504). With the ambient light detector 54 disabled, the luminaire 10 may operate such to illuminate an environment with motion detected in the field of view, regardless of ambient light levels. This may provide for operation during daylight.

If the first input has not been engaged for the threshold duration, for example three seconds, the operation may proceed to Block 506 wherein the controller 20 may determine whether a second input has been engaged for a threshold duration. If it is determined at Block 506 that the second input has been engaged for the threshold duration, the rule relating to the ambient light detector 54 may be defined to operate during the first three hours that ambient light detector 54 detects low ambient light levels (Block 508). In this operation, the luminaire 10 may illuminate an area with a dimmed brightness during the first three hours of low ambient light levels that no motion is detected. Again, the use of three hours as the time within which the luminaire may illuminate the area with a dimmed brightness is exemplary in nature and should not be read to limit any embodiment of the claimed invention in any way. Those skilled in the art, after having the benefit of this disclosure, will appreciate that the present invention contemplates that the luminaire may illuminate the area with a dimmed brightness for any amount of time. After the first three hours have expired, the luminaire 10 may emit no light in the subsequent hours and wherein no motion is detected. The luminaire 10 may emit light at full brightness upon the detection of motion.

If the second input has not been engaged for the threshold duration, for example three seconds (merely exemplary), the operation may proceed to Block 510 wherein the controller 20 may determine whether a third input has been engaged for a threshold duration. If it is determined at Block 510 that the third input has been engaged for the threshold duration, the rule relating to the ambient light detector 54 may be defined to operate during the first six hours that ambient light detector 54 detects low ambient light levels (Block 512). In this operation, the luminaire 10 may illuminate an area with a first brightness during the first six hours of low ambient light levels that no motion is detected. After the first six hours have expired, the luminaire 10 may emit no light in the subsequent hours and wherein no motion is detected. The luminaire 10 may emit light at full brightness upon the detection of motion.

If the third input has not been engaged for the threshold duration, for example three seconds, the operation may proceed to Block 514 wherein the controller 20 may determine whether a fourth input has been engaged for a threshold duration. If it is determined at Block 514 that the fourth input has been engaged for the threshold duration, the rule relating to the ambient light detector 54 may be defined to operate during the all hours that ambient light detector 54 detects low ambient light levels (Block 516). In this operation, the luminaire 10 may illuminate an area with a dimmed brightness during all hours of low ambient light levels and wherein no motion detected. The luminaire 10 may emit light at full brightness upon the detection of motion.

If the fourth input has not been engaged for the threshold duration, for example three seconds, the operation may proceed to Block 494, wherein the controller 20 may again monitor whether the ambient light detector input has been engaged.

If the rules have been defined in Blocks 504, 508, 512, or 516, the luminaire 10 may optionally provide feedback that the rule has been successfully changed (Block 520). The controller 20 may then determine if a shutdown command has been received at Block 522. If a shutdown command has not been received at Block 522, the operation may proceed to Block 494, wherein the controller 20 may again monitor whether the ambient light detector input has been engaged. If a shutdown command has been received at Block 522, the operation may terminate at Block 524.

In the above examples, and has been previously indicated, there are several references to specific periods of time within which certain functions are carried out. These types of references appear throughout this specification. Such references to specific periods of time are not meant to be limiting in any way. For the sake of clarity and for ease of reading, the examples have been provided so that the user may readily appreciate the function of the luminaire 10 and the system of the various embodiments of the present invention. Those skilled in the art will appreciate that any disclosure of a specific time period, and any illustration indicating a specific time period, are not meant to be limiting in any way, and that the time periods may be readily manipulable, if so desired.

Figure 21:
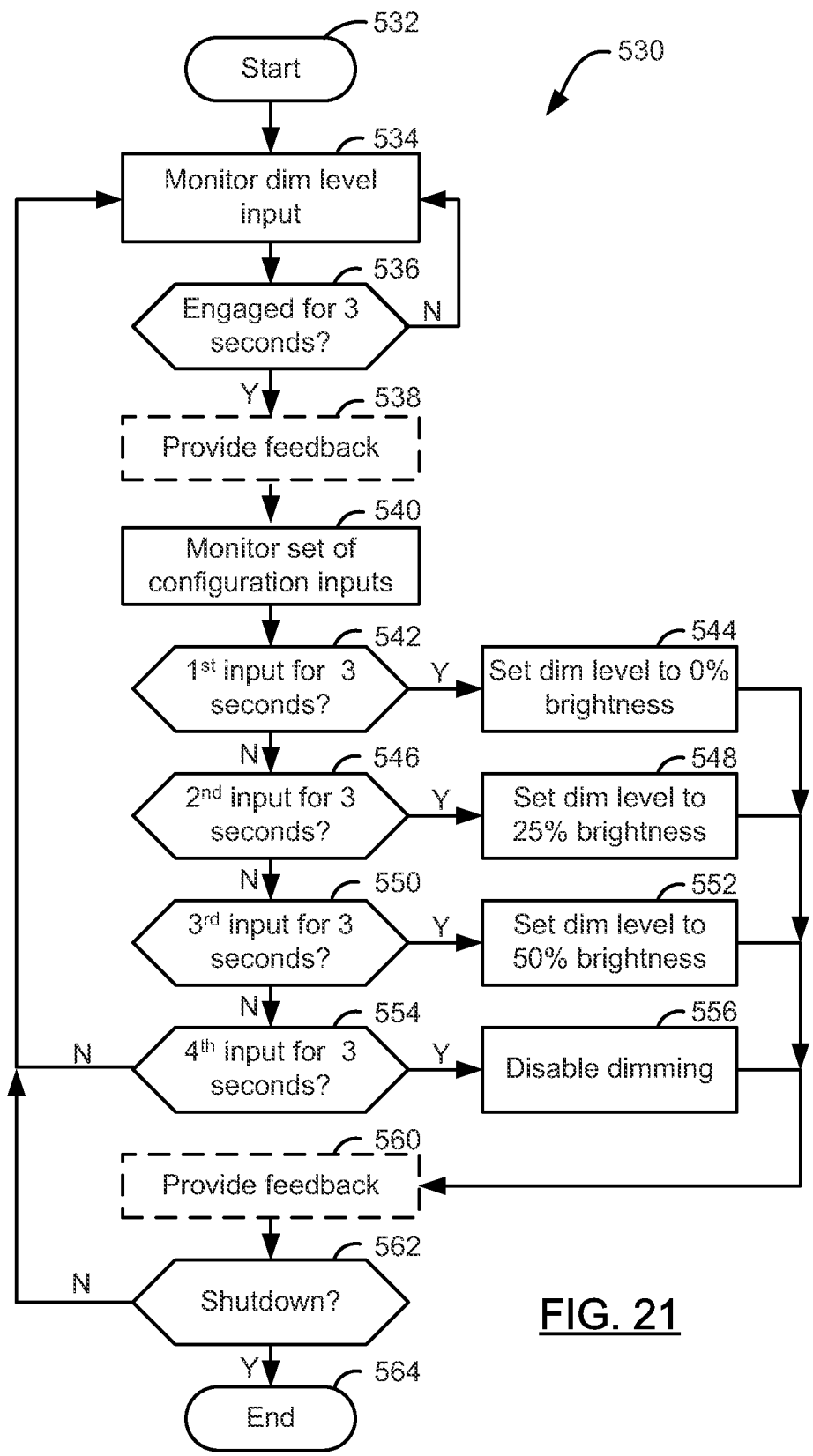

Referring now to flowchart 530 of FIG. 21, a specific; modification of a dim level by which the luminaire 10 may be operated when no motion is detected in the environment will now be discussed, without limitation. The dim level may affect the brightness of light emitted by a light source 40 when a low ambient light level is detected without motion being detected in the environment. Skilled artisans will appreciate that the rules manipulable in association with the dim level may be applied in conjunction with other rules, such as the rules relating to ambient light or motion detection.

Starting at Block 532, the controller 20 may monitor a dim input (Block 534). The controller 20 may then determine if the dim input has been engaged for a threshold duration, such as three seconds (Block 536). If the dim input has not been engaged for the threshold duration, the operation may return to Block 534 wherein the controller 20 will continue to monitor the dim input. If it is determined at Block 536 that the dim input has been engaged for the threshold duration, the luminaire 10 may optionally provide feedback that the dim input has been properly engaged (Block 538).

Once the dim input has been properly engaged, the controller 20 may monitor a set of configuration inputs (Block 540). The set of configuration inputs may include one or more inputs that may be engaged by a user to manipulate the rules. Although the following example discusses four configuration inputs, a person of skill in the art will appreciate that any number of configuration inputs may be included in the set of configuration inputs, without limitation.

In determining if a configuration input has been engaged, the controller 20 may determine if a first input has been engaged for a threshold duration (Block 542). If it is determined at Block 542 that the first input has been engaged for the threshold duration, the rule relating to the dim level may be disabled (Block 544). With the dim level disabled, the luminaire 10 may operate such that no light is emitted when motion is not sensed in the field of view, regardless of the ambient light levels sensed by an ambient light detector 54.

If the first input has not been engaged for the threshold duration, for example three seconds, the operation may proceed to Block 546 wherein the controller 20 may determine whether a second input has been engaged for a threshold duration. If it is determined at Block 546 that the second input has been engaged for the threshold duration, the rule relating to the dim level may be defined to operate at, for example, twenty-five percent brightness (Block 548). Similar to the time durations mentioned above, the percentage of brightness described with reference to Block 544, 548, 552, and 556 are merely exemplary and those skilled in the art will appreciate that any brightness level is readily contemplated by the embodiments of the present invention. With the dim level being defined as twenty-five percent, the luminaire 10 may operate one or more light source 40 to illuminate an environment with approximately twenty-five percent brightness when no motion is detected in the environment.

If the second input has not been engaged for the threshold duration, for example three seconds, the operation may proceed to Block 550 wherein the controller 20 may determine whether a third input has been engaged for a threshold duration. If it is determined at Block 550 that the third input has been engaged for the threshold duration, the rule relating to the dim level may be defined to operate at fifty percent brightness (Block 552). With the dim level being defined as fifty percent, the luminaire 10 may operate one or more light source 40 to illuminate an environment with approximately fifty percent brightness when no motion is detected in the environment.

If the third input has not been engaged for the threshold duration, for example three seconds, the operation may proceed to Block 554 wherein the controller 20 may determine whether a fourth input has been engaged for a threshold duration. If it is determined at Block 554 that the fourth input has been engaged for the threshold duration, the rule relating to the dim level may be defined to disable dimming (Block 556). With the dimming being disabled, the luminaire 10 may operate such that it will not respond to motion detected in the field of view. However, in an embodiment, the sensors 50 may continue to detect ambient light levels, which may continue to affect operation of the luminaire 10.

If the fourth input has not been engaged for the threshold duration, for example three seconds, the operation may proceed to Block 534, wherein the controller 20 may again monitor whether the dim input has been engaged.

If the rules have been defined in Blocks 544, 548, 552, or 556, the luminaire 10 may optionally provide feedback that the rule has been successfully changed (Block 560). The controller 20 may then determine if a shutdown command has been received at Block 562. If a shutdown command has not been received at Block 562, the operation may proceed to Block 534, wherein the controller 20 may again monitor whether the dim input has been engaged. If a shutdown command has been received at Block 562, the operation may terminate at Block 564.

Figure 22:
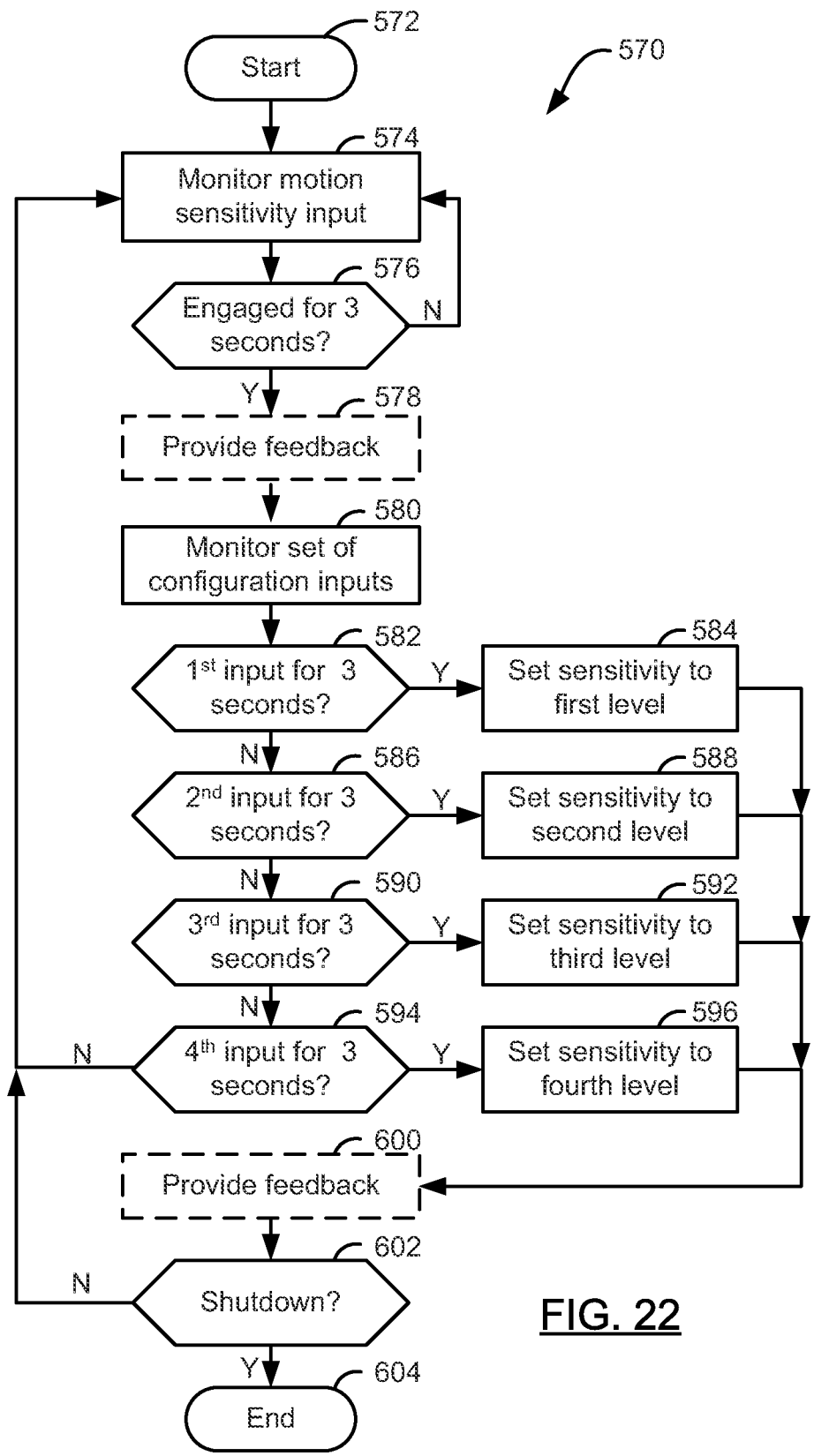

Referring now to flowchart 570 of FIG. 22, a specific modification of motion detection sensitivity using the interlace 30 will now be discussed, without limitation. The sensitivity of motion detection definable in the rules may operate in conjunction with other rules, such as the rules relating to the delay or ambient light levels detected. Additionally, in the present example, levels of sensitivity are discussed between a first level and a fourth level, with each level offering increased sensitivity in motion detection. Increased sensitivity may be provided, for example, by increasing the distance in which motion is detectable. A person of skill in the art should appreciate that the present invention should not be limited to four levels of motion detecting sensitivity, and that any number of levels may be added or removed as the desired for the operation of the luminaire 10.

Starting at Block 572, the controller 20 may monitor a motion sensitivity input (Block 574). The controller 20 may then determine if the motion sensitivity input has been engaged for a threshold duration, such as three seconds (Block 576). If the motion sensitivity input has not been engaged for the threshold duration, the operation may return to Block 574 wherein the controller 20 will continue to monitor the motion sensitivity input. If it is determined at Block 576 that the motion sensitivity input has been engaged for the threshold duration, the luminaire 10 may optionally provide feedback that the motion sensitivity input has been properly engaged (Block 578).

Once the motion sensitivity input has been properly engaged, the controller 20 may monitor a set of configuration inputs (Block 580). The set of configuration inputs may include one or more inputs that may be engaged by a user to manipulate the rules. Although the following example discusses four configuration inputs, a person of skill in the art will appreciate that any number of configuration inputs may be included in the set of configuration inputs, without limitation.

In determining if a configuration input has been engaged, the controller 20 may determine if a first input has been engaged for a threshold duration (Block 582). If it is determined at Block 582 that the first input has been engaged for the threshold duration, the rule relating to the sensitivity of motion detection may be defined to operate at a first level (Block 584). With sensitivity being defined in the rules at the first level, the luminaire 10 may operate to detect motion in an environment with a small the field of view.

If the first input has not been engaged for the threshold duration, for example three seconds, the operation may proceed to Block 586 wherein the controller 20 may determine whether a second input has been engaged for a threshold duration. If it is determined at Block 586 that the second input has been engaged for the threshold duration, the rule relating to the sensitivity of motion detection may be defined to operate at a second level (Block 588). With sensitivity being defined in the rules at the second level, the luminaire 10 may operate to detect motion in an environment with a field of view larger than the first level of sensitivity.

If the second input has not been engaged for the threshold duration, for example three seconds, the operation may proceed to Block 590 wherein the controller 20 may determine whether a third input has been engaged for a threshold duration. If it is determined at Block 590 that the third input has been engaged for the threshold duration, the rule relating to the sensitivity of motion detection may be defined to operate at a third level (Block 592). With sensitivity being defined in the rules at the third level, the luminaire 10 may operate to detect motion in an environment with a field of view larger than the second level of sensitivity.

If the third input has not been engaged for the threshold duration, for example three seconds, the operation may proceed to Block 594 wherein the controller 20 may determine whether a fourth input has been engaged for a threshold duration. If it is determined at Block 594 that the fourth input has been engaged for the threshold duration, the rule relating to the sensitivity of motion detection may be defined to operate at a fourth level (Block 596). With sensitivity being defined in the rules at the fourth level, the luminaire 10 may operate to detect motion in an environment with a field of view larger than the third level of sensitivity.

If the fourth input has not been engaged for a duration less than the threshold duration, for example three seconds, the operation may proceed to Block 574, wherein the controller 20 may again monitor whether the motion sensitivity input has been engaged.

If the rules have been defined in Blocks 584, 588, 592, or 596, the luminaire 10 may optionally provide feedback that the rule has been successfully changed (Block 600). The controller 20 may then determine if a shutdown command has been received at Block 602. If a shutdown command has not been received at Block 602, the operation may proceed to Block 574, wherein the controller 20 may again monitor whether the motion sensitivity input has been engaged. If a shutdown command has been received at Block 602, the operation may terminate at Block 604.

The foregoing examples have been provided in the interest of clarity to illustrate an embodiment of the present invention in substantial detail. A person of skill in the art will appreciate that the interface 30 may include additional inputs, which may be used to define the rules relating to various sensors 50. As examples, and without the intent to be limiting, additional sensors may detect temperature, humidity, barometric pressure, altitude, levels of certain gases, presence of vermin or other animals, seismic activity, electromagnetic radioactivity, or intensity of ultraviolet light.

Also, as discussed above, an alert may be provided upon detecting a condition of the environment, for example, using one of the sensors listed above. Alerts may include illumination, bunking, flashing, sound, transmitting a data signal, or other providing another form of indication that an condition has been detected or an event has occurred.

Furthermore, as additional sensors 50 may be included in the luminaire 10, additional inputs may be provided to allow customization to the rules relating to the additional sensors. In additional embodiments of the present invention, the inputs 32 may be configured to manipulate the rules with different combinations of engagement. The rules relating to the operation of the inputs 32 may even be defined through engagement of the inputs. As such, skilled artisans should not view the present invention as limited to the examples discussed above.

A person of skill in the art will appreciate that one or more of the above provided embodiments may be included in the operation of the luminaire 10 of the present invention. Additionally, a person of skill in the art will appreciate additional embodiments that would be included within the scope and spirit of the present invention, after having the benefit of this disclosure. Furthermore, a skilled artisan will appreciate that the operations described above, along with additional operations that would be apparent to those in the art, may be performed exclusively, incrementally, sequentially, simultaneously, or any other operative configuration.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A luminaire comprising:
   a light source from which light is emittable into an environment;
   a controller including a processor and memory to analyze data relating to conditions in the environment and to control the light source;
   sensors in communication with the controller to detect the conditions in the environment and generate the data relating to the conditions, the data being transmittable to the controller;
   rules definable to affect operation of the light source, the rules being stored in the memory to be comparable with the data;
   wherein the light source is operable in a plurality of modes defined by the rules;
   wherein operation of the light source is modifiable by the controller responsive to the data relating to at least one of the conditions;
   wherein the light source is operable having a duty cycle controlled by the controller, the duty cycle having an active duration wherein the light source emits the light and an inactive duration wherein the light source does not emit the light;
   wherein the sensors include a motion detector in communication with the controller to detect motion in the environment as the condition;
   wherein the motion detector transmits the data to the controller relating to the motion that is detected;
   wherein ambient light levels in the environment are detectable by at least one of the sensors in communication with the controller as the condition; and
   wherein data is transmitted to the controller relating to the ambient light levels that are detected, the ambient light levels being detectable during the inactive duration of the duty cycle.

2. A luminaire according to claim 1 further comprising a timer in communication with the controller, wherein the timer transmits data to the controller relating to an amount of time elapsed relating to an event definable by the rules, the timer being includable in the controller.

3. A luminaire according to claim 1 further comprising a network interface in communication with the controller, wherein at least part of the data is trans table by the controller using the network interface, and wherein at least part of the data is receivable by the controller using the network interface.

4. A luminaire according to claim 1 wherein the controller, the light source, and the sensors are included in a node that is part of a network of nodes, wherein a plurality of nodes are includable in the network of nodes, and wherein data is transmittable and receivable between the nodes included in the network of nodes.

5. A luminaire according to claim 4 wherein the node is spatially aware relative to at least one of the nodes in the network of nodes.

6. A luminaire according to claim 1 wherein the light source is a light emitting semiconductor device.

7. A luminaire according to claim 1 wherein the light emitted by the light source includes a source wavelength range, wherein at least part of the light in the source wavelength range is received by a phosphorescent, fluorescent, or luminescent conversion material to be converted to a converted wavelength range to be includable in the light.

8. A luminaire according to claim 1 wherein a light identifier is includable in the light.

9. A luminaire according to claim 8 further comprising:
an auxiliary signal emitter;
wherein the auxiliary signal emitter emits an auxiliary signal having a velocity that differs from the light;
wherein an auxiliary signal identifier is includable in the auxiliary signal;
wherein the light identifier and the auxiliary signal identifier are definable to identify the light that correlates with the auxiliary signal, wherein the light with the light identifier and the auxiliary signal with the auxiliary signal identifier are emitted substantially simultaneously;
wherein the light with the light identifier and the auxiliary signal with the auxiliary signal identifier are detectable by a device located in the environment;
wherein a delay between detecting the light with the light identifier and the auxiliary signal with the auxiliary signal identifier is analyzed to determine a spatial awareness.

10. A luminaire according to claim 9 wherein the light identifier and the auxiliary signal identifier are detectable by at least one of the sensors, and wherein the controller analyzes the delay to determine the spatial awareness.

11. A luminaire according to claim 10 wherein the auxiliary signal includes acoustic energy.

12. A luminaire according to claim 1 further comprising an interface to define the rules.

13. A luminaire according to claim 12 wherein the interface is manipulable to cause a signal to be sent to the controller, wherein the signal relates to a state of the interface.

14. A luminaire according to claim 13 wherein inputs of the interface include capacitive sensors, the state of at least one of the capacitive sensors being independently alterable upon being engaged, and wherein the state to which the capacitive sensors are alterable is definable by the rules.

15. A luminaire according to claim 13 wherein inputs of the interface include mechanical toggles, the state of at least one of the mechanical toggles being independently alterable upon being engaged, and wherein the state to which the mechanical toggles are alterable is definable by the rules.

16. A luminaire according to claim 1 wherein the ambient light levels are detectable by an ambient light detector in communication with the controller to detect the ambient light levels in the environment as the condition, wherein the controller receives the data from the ambient light detector relating to the ambient light levels that are detected.

17. A luminaire according to claim 1 wherein the controller is carried by a radio logic board; and wherein the luminaire further comprises an antenna coupled to the radio logic board.

18. A luminaire according to claim 17 wherein the radio logic board is separated from heat producing elements of the luminaire by a buffer distance.

19. A luminaire according to claim 1 wherein the light source is operable by dimming the light source or moving the light source between an on position and an off position.

20. A system for controlling a luminaire comprising:
a controller including a processor and memory to analyze data and to control a light source to emit light;
an interface that is manipulable to cause a signal to be sent to the controller, wherein the signal relates to a state of the interface;
sensors in communication with the controller to detect a condition in the environment and generate the data relating to the condition, the data being transmittable to the controller for analysis;
rules definable to affect operation of the light source, the rules being stored in the memory to be comparable with the data, the rules being definable using the interface;
wherein the light source is operable in a plurality of modes defined by the rules, at least one of the plurality of modes being selectable and definable using the interface.

21. A system according to claim 20 wherein the sensors include a motion detector in communication with the controller to detect motion in the environment as the condition, wherein the motion detector transmits the data to the controller relating to the motion that is detected.

22. A system according to claim 20 wherein the light source is operable having a duty cycle controlled by the controller, the duty cycle having an active duration wherein the light source emits the light and an inactive duration wherein the light source does not emit the light.

23. A system according to claim 22 wherein the sensors include an ambient light detector in communication with the controller to detect ambient light levels in the environment as the condition, wherein the ambient light detector transmits the data to the controller relating to the ambient light levels that are detected, the ambient light detector detecting the ambient light levels during the inactive duration of the duty cycle.

24. A system according to claim 20 further comprising a timer in communication with the controller, wherein the timer transmits data to the controller relating to an amount of time elapsed relating to an event definable by the rules, the timer being includable in the controller.

25. A system according to claim 20 further comprising a network interface in communication with the controller, wherein at least part of the data is trans table by the controller using the network interface, and wherein at least part of the data is receivable by the controller using the network interface.

26. A system according to claim 20 wherein the controller, light source, and sensors are included in a node that is part of a network of nodes, wherein a plurality of nodes are includable in the network of nodes, wherein data is transmittable and receivable between the nodes included in the network of nodes.

27. A system according to claim 26 wherein the node is spatially aware relative to at least one of the nodes in the network of nodes.

28. A system according to claim 20 wherein the light source is a light emitting semiconductor device.

29. A system according to claim 20 wherein the light emitted by the light source includes a source wavelength range, wherein at least part of the light in the source wavelength range is received by a phosphorescent, fluorescent, or luminescent conversion material to be converted to a converted wavelength range to be includable in the light.

30. A system according to claim 20 wherein inputs of the interface include capacitive sensors, the state of at least one of the capacitive sensors being independently alterable upon being engaged by an object, and wherein the state to which the capacitive sensor is alterable is definable by the rules.

31. A system according to claim 20 wherein inputs of the interface include mechanical toggles, the state of at least one of the mechanical toggles being independently alterable upon being engaged by an object, and wherein the state to which the mechanical toggles is alterable is definable by the rules.

32. A system according to claim 20 wherein a light identifier is includable in the light.

33. A system according to claim 32 further comprising:
an auxiliary signal emitter;
wherein the auxiliary signal emitter emits an auxiliary signal having a velocity that differs from the light;
wherein an auxiliary signal identifier is includable in the auxiliary signal;
wherein the light identifier and the auxiliary signal identifier are definable to identify the light that correlates with the auxiliary signal that is emitted substantially simultaneously;
wherein the light with the light identifier and the auxiliary signal with the auxiliary signal identifier are detectable by a device located in the environment;
wherein the controller analyzes a delay between detecting the light with the light identifier and the auxiliary signal with the auxiliary signal identifier to determine a spatial awareness.

34. A system according to claim 33 wherein the auxiliary signal includes acoustic energy.

35. A system according to claim 20 wherein the controller, the sensors, and the interface are included in the luminaire.

36. A system according to claim 20 wherein the controller is carried by a radio logic board; wherein the system further comprises an antenna coupled to the radio logic board; and wherein the radio logic board is separated from heat producing elements of the luminaire by a buffer distance.

37. A system according to claim 20 wherein the light source is operable by dimming the light source or moving the light source between an on position and an off position.

38. A luminaire comprising:
a light source from which light is emittable into an environment;
a controller including a processor and memory to analyze data relating to conditions in the environment and to control the light source;
sensors in communication with the controller to detect the conditions in the environment and generate the data relating to the conditions, the data being transmittable to the controller;
rules definable to affect operation of the light source, the rules being stored in the memory to being comparable with the data; and
an auxiliary signal emitter;
wherein the light source is operable in a plurality of modes defined by the rules;
wherein the operation of the light source is modifiable by the controller responsive to the data relating to at least one of the conditions;
wherein the auxiliary signal emitter emits an auxiliary signal with a velocity that differs from the light;
wherein a light identifier is includable in the light and an auxiliary signal identifier is includable in the auxiliary signal;
wherein the light identifier and the auxiliary signal identifier are definable to identify the light that correlates with the auxiliary signal, wherein the light with the light identifier and the auxiliary signal with the auxiliary signal identifier are emitted substantially simultaneously;
wherein the light with the light identifier and the auxiliary signal with the auxiliary signal identifier are detectable by a device located in the environment;
wherein a delay between detecting the light with the light identifier and the auxiliary signal with the auxiliary signal identifier is analyzed to determine a spatial awareness.

39. A luminaire according to claim 38 wherein the light identifier and the auxiliary signal identifier are detectable by at least one of the sensors, and wherein the controller analyzes the delay to determine the spatial awareness.

40. A luminaire according to claim 38 wherein the auxiliary signal includes acoustic energy.

41. A luminaire according to claim 38 wherein the sensors include a motion detector in communication with the controller to detect motion in the environment as the condition; and wherein the motion detector transmits data to the controller relating to the motion that is detected.

42. A luminaire according to claim 38 wherein the light source is operable having a duty cycle controlled by the controller, the duty cycle having an active duration wherein the light source emits the light and an inactive duration wherein the light source does not emit the light; wherein the sensors include an ambient light detector in communication with the controller to detect ambient light levels in the environment as the condition; and wherein the ambient light detector transmits the data to the controller relating to the ambient light level detected, the ambient light detector detecting the ambient light level during the inactive duration of the duty cycle.

43. A luminaire according to claim 38 further comprising a timer in communication with the controller, wherein the timer transmits data to the controller relating to an amount of time elapsed relating to an event definable by the rules, the timer being includable in the controller.

44. A luminaire according to claim 38 further comprising a network interface in communication with the controller, wherein at least part of the data is transmittable by the controller using the network interface, and wherein at least part of the data is receivable by the controller using the network interface.

45. A luminaire according to claim 38 wherein the controller, the light source, and the sensors are included in a node that is part of a network of nodes, wherein a plurality of nodes are includable in the network of nodes, wherein data is transmittable and receivable between the nodes included in the network of nodes.

46. A luminaire according to claim 45 wherein the node is spatially aware relative to at least one of the nodes in the network of nodes.

47. A luminaire according to claim 38 wherein the light source is a light emitting semiconductor device.

48. A luminaire according to claim 38 wherein the light emitted by the light source includes a source wavelength range, wherein at least part of the light in the source wavelength range is received by a phosphorescent, fluorescent, or luminescent conversion material to be converted to a converted wavelength range to be includable in the light.

49. A luminaire according to claim 38 further comprising an interface to define the rules.

50. A luminaire according to claim 49 wherein the interface is manipulable to cause a signal to be sent to the controller, wherein the signal relates to a state of the interface.

51. A luminaire according to claim 50 wherein the inputs of the interface include capacitive sensors, the state of at least one of the capacitive sensors being independently alterable upon being engaged, and wherein the states to which the capacitive sensors are altered is definable by the rules.

52. A luminaire according to claim 50 wherein the inputs of the interface include mechanical toggles, the state of at least one of the mechanical toggles is being independently alterable upon being engaged by an object, and wherein the state to which the mechanical toggles is are alterable is definable by the rules.

53. A luminaire according to claim 38 wherein the controller is carried by a radio logic board; wherein the luminaire further comprises an antenna coupled to the radio logic board; and wherein the radio logic board is separated from heat producing elements of the luminaire by a buffer distance.

54. A luminaire according to claim 38 wherein the light source is operable by dimming the light source or moving the light source between an on position and an off position.

55. A method for controlling a luminaire with an interface, the method comprising:
receiving a signal by a controller from the interface, the interface being manipulable to generate the signal, the controller including a processor and memory;
analyzing the signal using the controller by comparing the signal to rules included in the memory, at least part of the rules being definable using the interface to control operation of a light source to emit light;
receiving data from sensors in communication with the controller relating to a condition detected in the environment, the data being receivable by the controller from the sensors for analysis; and
comparing the data received by the sensor with at least part of the rules to operate the light source in a mode determined by comparing the data with the rules;
wherein the interface is manipulable to cause the signal to be sent to the controller;
wherein the signal relates to a state of the interface.

56. A method according to claim 55 wherein inputs of the interface include capacitive sensors, the state of at least one of the capacitive sensors being independently alterable upon being engaged, and wherein the state to which the capacitive sensors are alterable is definable by the rules.

57. A method according to claim 55 wherein the inputs of the interface include mechanical toggles, the state of at least one of the mechanical toggles is being independently alterable upon being engaged by an object, and wherein the state to which the mechanical toggles is are alterable is definable by the rules.

58. A method according to claim 55 further comprising transmitting the data from a motion detector to the controller, wherein the data relates to motion that is detected by the motion detector.

59. A method according to claim 55 wherein the light source is operable having a duty cycle controlled by the controller, the duty cycle having an active duration wherein the light source emits the light and an inactive duration wherein the light source does not emit the light.

60. A method according to claim 59 further comprising transmitting the data from an ambient light detector to the controller, wherein the data relates to ambient light levels that are detected during the inactive duration of the duty cycle by the ambient light detector.

61. A method according to claim 55 further comprising transmitting data from a timer to the controller, wherein the data includes an amount of time elapsed relating to an event definable by the rules.

62. A method according to claim 55 wherein a network interface is in communication with the controller, wherein at least part of the data is transmittable by the controller using the network interface, and wherein at least part of the data is receivable by the controller using the network interface.

63. A method according to claim 62 wherein the controller, light source, and sensors are included in a node that is part of a network of nodes, wherein a plurality of nodes are includable in the network of nodes, wherein data is transmittable and receivable between the nodes included in the network of nodes.

64. A method according to claim 63 wherein the node is spatially aware relative to at least one of the nodes in the network of nodes.

65. A method according to claim 63 wherein the light source is a light emitting semiconductor device.

66. A method according to claim 55 wherein the light source is a light emitting semiconductor device.

67. A method according to claim 55 wherein the light emitted by the light source includes a source wavelength range, wherein at least part of the light in the source wavelength range is received by a phosphorescent, fluorescent, or luminescent conversion material to be converted to a converted wavelength range to be includable in the light.

68. A method according to claim 55 wherein a light identifier is includable in the light.

69. A method according to claim 68 wherein an auxiliary signal emitter is communicatively connected to the controller; wherein an auxiliary signal is emittable by the auxiliary signal emitter having a velocity that differs from the light; further comprising:
including an auxiliary signal identifier in the auxiliary signal, the light identifier and the auxiliary signal identifier being definable to identify the light that correlates with the auxiliary signal, wherein the light with the light identifier and the auxiliary signal with the auxiliary signal identifier are emitted substantially simultaneously;
detecting the light with the light identifier and the auxiliary signal with the auxiliary signal identifier; and
analyzing a delay between detecting the light with the light identifier and detecting the auxiliary signal with the auxiliary signal identifier to determine a spatial awareness.

70. A method according to claim 69 wherein the auxiliary signal includes acoustic energy.

71. A method according to claim 55 wherein the controller is carried by a radio logic board that is separated from heat producing elements of the luminaire by a buffer distance.

72. A method according to claim 55 wherein operation of the light source is controlled by dimming the light source or moving the light source between an on position and an off position.

73. A method for detecting a condition in an environment using a luminaire connected to a network, the method comprising:
receiving data from sensors in communication with a controller, the sensors detecting the condition in the environment and generating the data in response to the conditions;
analyzing the data relating to the condition in the environment, wherein analyzing the data includes comparing the data to rules stored in the memory;
controlling a light source from which light is emittable to operate in a mode determined from the analysis of the data relating to the condition in the environment and the rules, the mode in which the light source is operable being defined by the rules;
communicating at east part of the data through the network using a network interface, emitting an auxiliary signal with a velocity that differs from the light using an auxiliary signal emitter;

including a light identifier in the light;

including an auxiliary signal identifier in the auxiliary signal;

defining the light identifier and the auxiliary signal identifier to identify the light that correlates with the auxiliary signal, the light with the light identifier and the auxiliary signal with the auxiliary signal identifier being emitted substantially simultaneously, the light with the light identifier and the auxiliary signal with the auxiliary signal identifier being detectable by a device in the environment; and analyzing a delay between detecting the light with the light identifier and the auxiliary signal with the auxiliary signal identifier to determine a spatial awareness;

wherein the network interface is in communication with the controller, wherein at least part of the data is transmittable by the controller using the network interface, and wherein at least part of the data is receivable by the controller using the network interface.

74. A method according to claim 73 wherein the auxiliary signal includes acoustic energy.

75. A method according to claim 73 further comprising transmitting the data from a motion detector to the controller, wherein the data relates to motion that is detected by the motion detector.

76. A method according to claim 73 wherein the light source is operable having a duty cycle controlled by the controller, the duty cycle having an active duration wherein the light source emits the light and an inactive duration wherein the light source does not emit the light; further comprising transmitting the data from an ambient light detector to the controller, wherein the data relates to ambient light level detected, the ambient light detector detecting the ambient light level during the inactive duration of the duty cycle by the ambient light detector.

77. A method according to claim 73 further comprising transmitting data from a timer is in communication with the controller, wherein the timer transmits data to the controller regarding an amount of time elapsed relating to an event definable by the rules, the timer being includable in the controller.

78. A method according to claim 73 wherein the controller, the light source, and the sensors are included in a node that is part of a network of nodes, wherein a plurality of nodes are includable in the network of nodes, wherein data is transmittable and receivable between the nodes included in the network of nodes.

79. A method according to claim 78 wherein the node is spatially aware relative to at least one of the nodes in the network of nodes.

80. A method according to claim 73 wherein the light emitted by the light source includes a source wavelength range, wherein at least part of the light in the source wavelength range is received by a phosphorescent, fluorescent, or luminescent conversion material to be converted to a converted wavelength range to be includable in the light.

81. A method according to claim 73 further comprising manipulating an interface to define the rules.

82. A method according to claim 81 further comprising:

receiving a signal by the controller from the interface, the interface being manipulable to generate the signal; and comparing the signal to the rules included in the memory, at least part of the rules being definable using the interface to control operation of the light source;

wherein the interface includes inputs that are manipulable to cause the signal to be sent to the controller;

wherein the signal relates to states of the inputs.

83. A method according to claim 73 wherein the controller is carried by a radio logic board that is separated from heat producing elements of the luminaire by a buffer distance that facilitates reduced attenuation of the signal.

84. A method according to claim 73 wherein operation of the light source is controlled by dimming the light source or moving the light source between an on position and an off position.

* * * * *